(12) United States Patent
Ichikawa et al.

(10) Patent No.: US 9,142,986 B2
(45) Date of Patent: Sep. 22, 2015

(54) COIL UNIT, NON-CONTACT POWER TRANSMITTING APPARATUS, NON-CONTACT POWER RECEIVING APPARATUS, VEHICLE, AND NON-CONTACT POWER SUPPLY SYSTEM

(75) Inventors: Shinji Ichikawa, Toyota (JP); Tetsuhiro Ishikawa, Toyota (JP); Nobuyoshi Kikuma, Nagoya (JP); Masafumi Kadoi, Chita (JP)

(73) Assignees: TOYOTA JIDOSHA KABUSHIKI KAISHA, Toyota (JP); NATIONAL UNIVERSITY CORPORATION NAGOYA INSTITUTE OF TECHNOLOGY, Nagoya (JP)

( * ) Notice: Subject to any disclaimer, the term of this patent is extended or adjusted under 35 U.S.C. 154(b) by 344 days.

(21) Appl. No.: 13/811,748

(22) PCT Filed: Jul. 20, 2011

(86) PCT No.: PCT/IB2011/001698
§ 371 (c)(1),
(2), (4) Date: Jan. 30, 2013

(87) PCT Pub. No.: WO2012/014038
PCT Pub. Date: Feb. 2, 2012

(65) Prior Publication Data
US 2013/0127411 A1 May 23, 2013

(30) Foreign Application Priority Data
Jul. 28, 2010 (JP) .................. 2010-169341

(51) Int. Cl.
*H02J 7/00* (2006.01)
*H04B 5/00* (2006.01)
(Continued)

(52) U.S. Cl.
CPC ............. *H02J 7/0052* (2013.01); *B60L 11/182* (2013.01); *H01F 38/14* (2013.01); *H02J 5/005* (2013.01);
(Continued)

(58) Field of Classification Search
CPC ........... H02J 5/005; H02J 17/00; H02J 7/025; B60L 11/182; B60L 11/1829; H04B 5/0093
USPC .................................................. 320/107, 108
See application file for complete search history.

(56) References Cited

U.S. PATENT DOCUMENTS 6,176,433 B1  1/2001  Uesaka et al.
7,211,986 B1 *  5/2007  Flowerdew ................... 320/108
(Continued)

FOREIGN PATENT DOCUMENTS

JP  A-7-67270  3/1995
JP  A-11-32452  2/1999
(Continued)

OTHER PUBLICATIONS

U.S. Appl. No. 13/643,480 filed in the name of Hiroyuki Sakakibara et al. on Oct. 25, 2012.

*Primary Examiner* — Sun Lin
(74) *Attorney, Agent, or Firm* — Oliff PLC

(57) ABSTRACT

A coil unit includes a second resonance coil that has a plurality of unit coils and performs at least one of transmission and reception of electric power to and from a first resonance coil spaced apart from the second resonance coil via electromagnetic resonance with the first resonance coil. The directions of magnetic fields formed by the unit coils are the same.

12 Claims, 22 Drawing Sheets

(51) Int. Cl.
*B60L 11/18* (2006.01)
*H01F 38/14* (2006.01)
*H02J 5/00* (2006.01)

(52) U.S. Cl.
CPC ............ *H04B 5/0037* (2013.01); *H04B 5/0075* (2013.01); *Y02T 10/7005* (2013.01); *Y02T 90/122* (2013.01); *Y02T 90/14* (2013.01)

(56) References Cited

U.S. PATENT DOCUMENTS

| | | | |
|---|---|---|---|
| 8,035,255 B2 * | 10/2011 | Kurs et al. | 307/104 |
| 8,482,158 B2 * | 7/2013 | Kurs et al. | 307/104 |
| 8,674,550 B2 * | 3/2014 | Bohori et al. | 307/104 |
| 8,928,276 B2 * | 1/2015 | Kesler et al. | 320/108 |
| 2008/0061785 A1 | 3/2008 | Soutome et al. | |
| 2009/0045773 A1 * | 2/2009 | Pandya et al. | 320/108 |
| 2010/0065352 A1 | 3/2010 | Ichikawa | |
| 2010/0141369 A1 | 6/2010 | Mori | |
| 2010/0225271 A1 * | 9/2010 | Oyobe et al. | 320/108 |
| 2011/0074347 A1 * | 3/2011 | Karalis et al. | 320/108 |
| 2012/0032525 A1 | 2/2012 | Oyobe et al. | |

FOREIGN PATENT DOCUMENTS

| | | |
|---|---|---|
| JP | A-2003-79597 | 3/2003 |
| JP | A-2008-67807 | 3/2008 |
| JP | A-2009-106136 | 5/2009 |
| JP | A-2010-73976 | 4/2010 |
| JP | A-2011-205757 | 10/2011 |
| WO | 2009/054221 A1 | 4/2009 |

* cited by examiner

F I G . 7
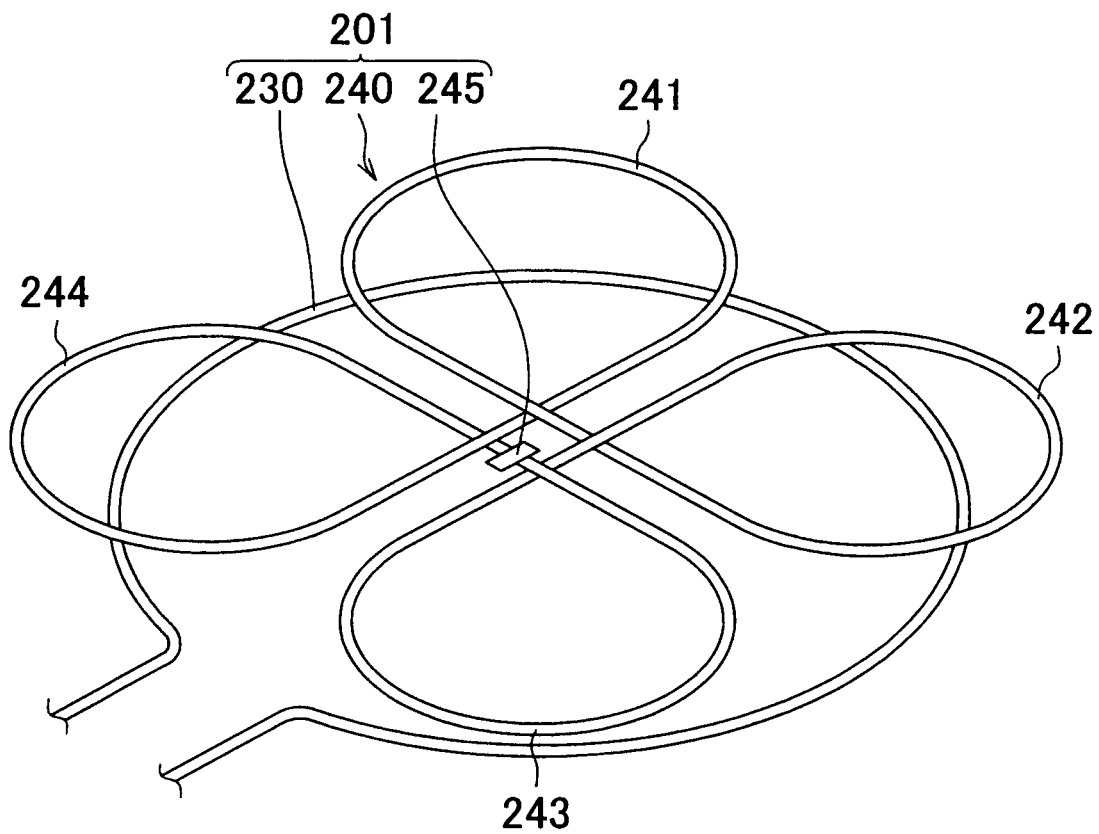

F I G . 27
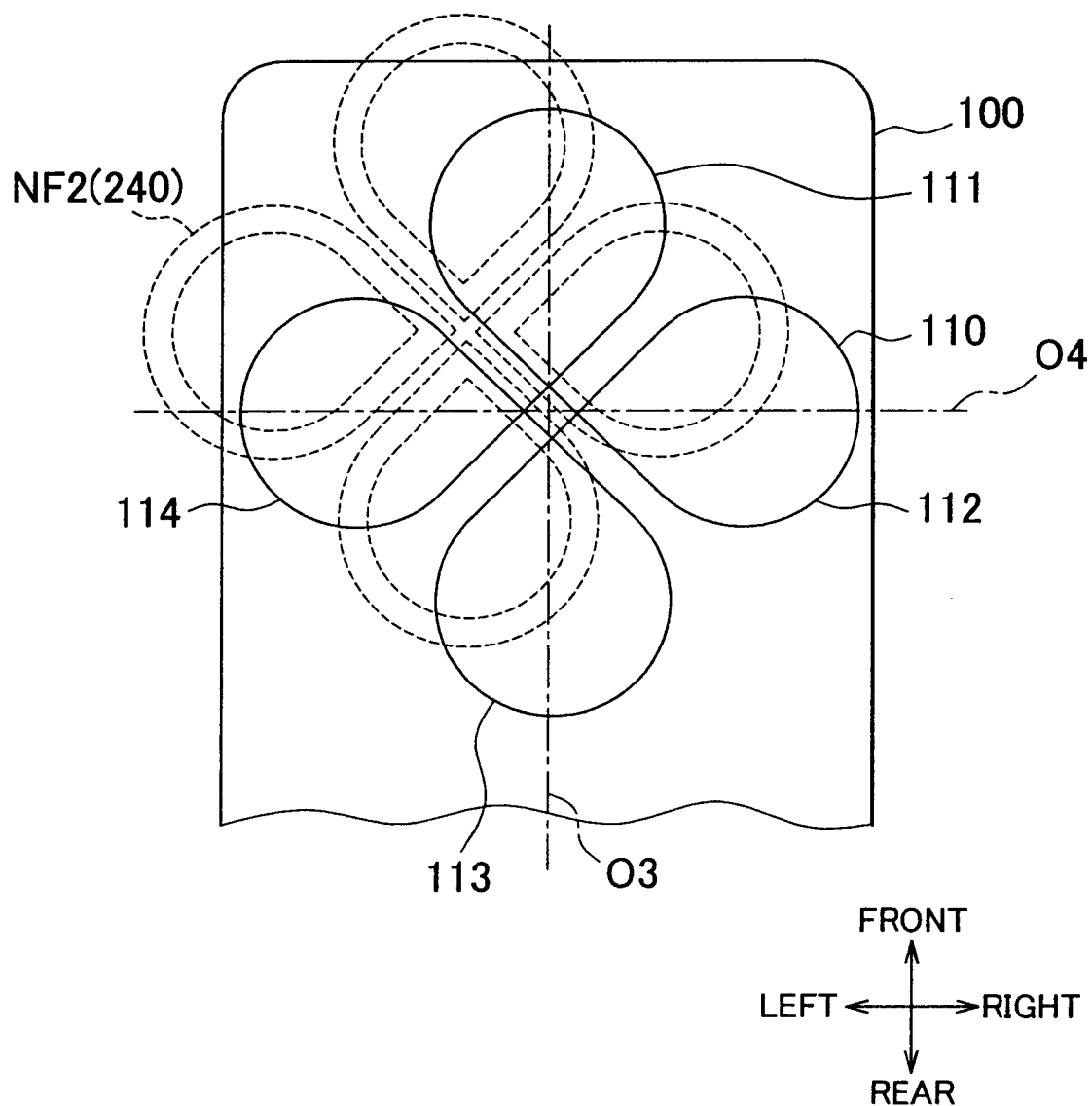

COIL UNIT, NON-CONTACT POWER TRANSMITTING APPARATUS, NON-CONTACT POWER RECEIVING APPARATUS, VEHICLE, AND NON-CONTACT POWER SUPPLY SYSTEM

BACKGROUND OF THE INVENTION

1. Field of the Invention

The invention relates to a coil unit, a non-contact power transmitting apparatus, a non-contact power receiving apparatus, a vehicle, and a non-contact power supply system.

2. Description of Related Art

As described in Japanese Patent Application Publications Nos. 2003-79597 and 2008-67807 (JP-A-2003-79597 and JP-A-2008-67807), coil units have already been used in magnetic resonance imaging apparatuses. In recent years, focus is placed on pure electric vehicles and hybrid vehicles as an interest in the environment is growing and as a result, charging methods, such as an electromagnetic induction method and a resonance method, in which a coil unit is used, is attracting attention as a candidate of the charging method, in which a battery mounted on a vehicle is contactlessly charged by an external source.

A non-contact power supply system described in Japanese Patent Application Publication No. 7-67270 (JP-A-7-67270), for example, includes a primary coil buried in the ground and a secondary coil mounted on a vehicle, in which a battery mounted on the vehicle is charged using a current induced in the secondary coil.

A wireless power transmitting apparatus described in Japanese Patent Application Publication No. 2010-73976 (JP-A-2010-73976) includes a power receiving device that is mounted on a pure electric vehicle and that includes a power receiving communication coil, and a power supply apparatus that includes a power transmitting communication coil and the power receiving device includes a power receiving communication coil. The power transmitting communication coil includes a primary coil and a resonance coil and the power receiving communication coil includes a primary coil and a resonance coil. Between the power receiving communication coil and the power transmitting communication coil, electric power is wirelessly transmitted through a resonant power transmitting method.

The distance between a primary coil and a secondary coil, between which electric power may be transmitted by the non-contact power transmitting method using electromagnetic induction, is small and this method therefore requires that the primary coil and the secondary coil be positioned close to each other. Accordingly, this power transmitting method is unsuitable when electric power is to be transmitted or received beyond a certain distance. However, in the wireless power transmitting apparatus described in JP-A-2010-73976, a resonant power transmitting method is used and therefore, electric power may be transmitted or received over a greater distance than in the case of the electromagnetic induction method.

Even if the power transmitting apparatus employs the resonant power transmitting method, however, when the power transmitting resonance coil and the power receiving resonance coil are misaligned, both power transmission efficiency and power reception efficiency are significantly decreased.

SUMMARY OF THE INVENTION

The invention provides a coil unit, a non-contact power transmitting apparatus, a non-contact power receiving apparatus, a vehicle, and a non-contact power supply system, with which it is possible to suppress reduction in power transmission efficiency or power reception efficiency even when a coil unit that includes a resonance coil capable of at least one of transmission and reception of electric power via electromagnetic resonance is misaligned with a counterpart resonance coil.

A coil unit according to a first aspect of the invention is a coil unit including a second self-resonant coil that has a plurality of unit coils and performs at least one of transmission and reception of electric power to and from a first self-resonant coil spaced apart from the second self-resonant coil via electromagnetic resonance with the first self-resonant coil. The directions of magnetic fields formed by the unit coils are the same. Note that the direction of the magnetic field herein means from which side of a unit coil to which side thereof the magnetic field formed by the unit coil passes through the unit coil. Thus, "directions of magnetic fields formed by the unit coils are the same" means that each magnetic field formed by a unit coil is formed so as to pass through the unit coil from the same side of all the unit coils. The unit coils may be arranged so as to be adjacent to each other. A configuration may be employed, in which the unit coils are disposed in substantially the same plane and do not overlap each other when viewed along the axial direction of each unit coil, and axes of the unit coils are substantially parallel. The number of turns of each of the unit coils may be set to one. The second self-resonant coil may be formed of a conducting wire.

The unit coils may be annularly arranged. A configuration may be employed, in which the number of unit coils is four and the unit coils are arranged so as to be rotationally symmetric with respect to an imaginary line. A configuration may be employed, in which a resonance frequency of the first self-resonant coil is equal to a resonance frequency of the second self-resonant coil; a first near field is formed around the first self-resonant coil by causing an electric current, whose frequency is set to the resonance frequency, to flow in the first self-resonant coil that is configured to be capable of at least one of transmission and reception of electric power to and from the second self-resonant coil; the second self-resonant coil is enabled to receive electric power from the first self-resonant coil by being positioned in the first near field; the second self-resonant coil is enabled to form a second near field around the second self-resonant coil by a flow of an electric current in the second self-resonant coil, whose frequency is set to the resonance frequency; and the second self-resonant coil is enabled to transmit electric power to the first self-resonant coil when the first self-resonant coil is positioned in the second near field.

A non-contact power transmitting apparatus according to a second aspect of the invention includes: a first electromagnetic induction coil that receives electric power from an external power source and transmits electric power to the second self-resonant coil; and the coil unit described above. A non-contact power receiving apparatus according to a third aspect of the invention includes the coil unit described above and a second electromagnetic induction coil that receives electric power from the second self-resonant coil.

A vehicle according to a fourth aspect of the invention includes the non-contact power receiving apparatus described above and an electrical storage device that receives electric power from the second electromagnetic induction coil. The unit coils may be arranged so as to be symmetric with respect to an imaginary axis that passes the widthwise center of the vehicle and extends in the longitudinal direction of the vehicle. The unit coils may be arranged so as to be symmetric with respect to an imaginary axis that extends in the width direction of the vehicle.

A non-contact power supply system according to a fifth aspect of the invention includes: a first coil unit having a first self-resonant coil having a plurality of first unit coils, wherein directions of magnetic fields formed by the first unit coils are the same; and a second coil unit having a second self-resonant coil having a plurality of second unit coils, the second coil unit being configured to perform at least one of transmission and reception of electric power to and from the first self-resonant coil via electromagnetic resonance with the first self-resonant coil, wherein directions of magnetic fields formed by the second unit coils are the same. A configuration may be employed, in which the first unit coils are arranged so as to be adjacent to each other and the second unit coils are arranged so as to be adjacent to each other.

With the coil unit, the non-contact power transmitting apparatus, the non-contact power receiving apparatus, the vehicle, and the non-contact power supply system according to the invention, it is possible to maintain high efficiency in transmitting and receiving electric power even when the resonance coils are misaligned.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a perspective view schematically showing a coil unit 201 mounted in a power supply apparatus 200;

FIG. 27 is a partial plan view of the vehicle that schematically shows a state brought about in a case where the secondary resonance coil 110 including the plurality of unit coils is mounted on the vehicle.

DETAILED DESCRIPTION OF EMBODIMENTS

Figure 1:
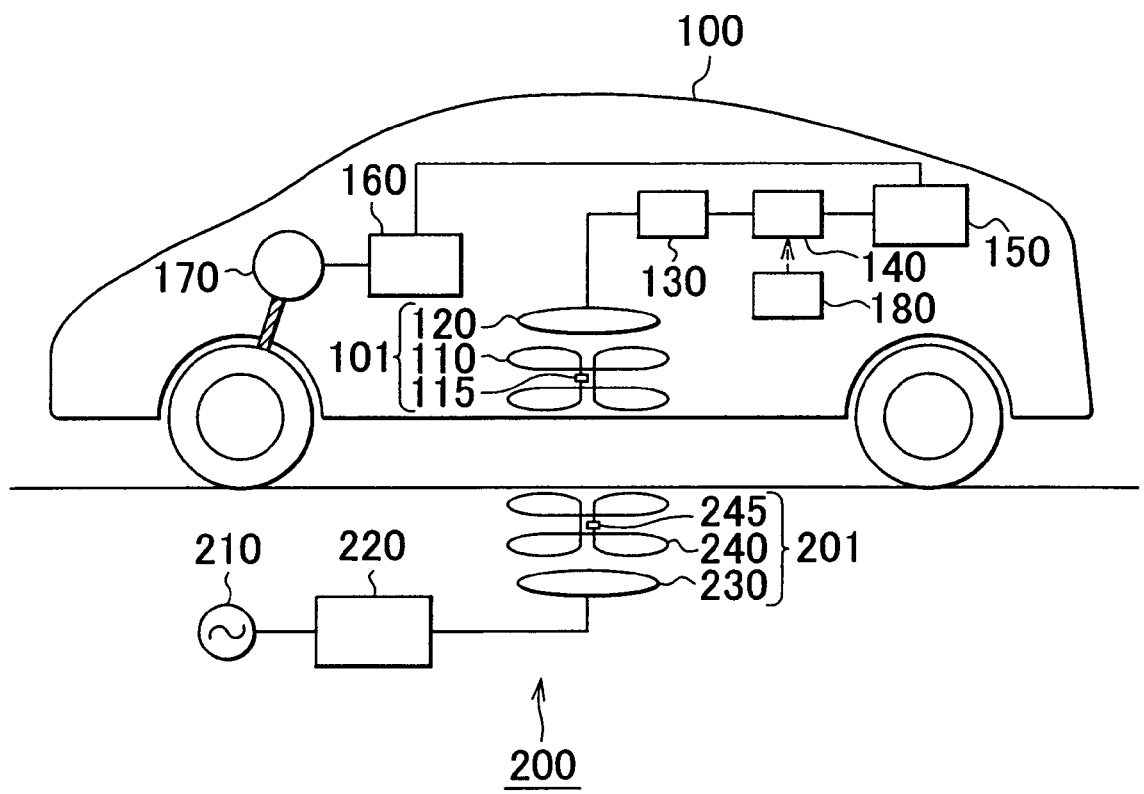
FIG. 1 shows an overall configuration of a basic non-contact power supply system.

An embodiment of the invention will be described in detail below with reference to the drawings. Note that the same or corresponding portions in the drawings are designated by the same reference numeral and the description thereof is not repeated.

FIG. 1 shows an overall configuration of a basic non-contact power supply system. Referring to FIG. 1, the non-contact power supply system includes a vehicle 100 and a power supply apparatus 200.

The vehicle 100 includes a coil unit 101, a rectifier 130, a DC/DC converter 140, an electrical storage device 150, a power control unit (hereinafter also referred to as the "PCU) 160, an electric motor 170, and a vehicle electronic control unit (ECU) 180.

The configuration of the vehicle 100 is not limited to that shown in FIG. 1 as long as the vehicle is driven by an electric motor. Examples of the vehicle 100 include a hybrid vehicle provided with an electric motor and an internal combustion engine, a fuel cell vehicle provided with a fuel cell, and a pure electric vehicle.

The coil unit 101 includes a secondary resonance coil 110, a capacitor 115 provided for the secondary resonance coil 110, and a secondary electromagnetic induction coil 120. The secondary resonance coil 110 may be provided under a vehicle body, for example. The secondary resonance coil 110 is an LC resonator, which performs at least one of transmission and reception of electric power to and from the power supply apparatus 200 via electromagnetic field resonance with a primary resonance coil 240 of a coil unit 201 provided in the power supply apparatus 200. For the capacitive component of the secondary resonance coil 110, a capacitor 115 is provided for the secondary resonance coil 110 in order to obtain a predetermined capacitance. If the parasitic capacitance of the coil suffices, however, the capacitor 115 may be omitted.

The secondary resonance coil 110 is configured based on the distance between the secondary resonance coil 110 and the primary resonance coil 240 of the power supply apparatus 200, the resonance frequency of the primary resonance coil 240 and the secondary resonance coil 110, etc. so that the Q factor (Q>100, for example), which indicates the intensity of resonance of the primary resonance coil 240 and the secondary resonance coil 110, κ that indicates the degree of coupling therebetween, etc. become large.

The secondary electromagnetic induction coil 120 is provided coaxially with the secondary resonance coil 110 and may be magnetically coupled to the secondary resonance coil 110 via electromagnetic induction. The secondary electromagnetic induction coil 120 receives, via electromagnetic induction, electric power received by the secondary resonance coil 110 to output the electric power to the rectifier 130.

The rectifier 130 rectifies the alternating-current (AC) power received by the secondary electromagnetic induction coil 120 and outputs the resultant direct-current (DC) power to the DC/DC converter 140. In accordance with the control signal from the vehicle ECU 180, the DC/DC converter 140 converts the electric power rectified by the rectifier 130 to a voltage level of the electrical storage device 150 and outputs the electric power to the electrical storage device 150. Note that when electric power is received from the power supply apparatus 200 while the vehicle is running, the DC/DC converter 140 may convert the electric power rectified by the rectifier 130 to the system voltage and directly supply the electric power to the PCU 160. The DC/DC converter 140 is not necessary. A configuration in which the AC power received by the secondary electromagnetic induction coil 120 is rectified by the rectifier 130 and then directly supplied to the electrical storage device 150 may be used instead.

The electrical storage device 150 is a rechargeable DC power source and examples thereof include secondary batteries, such as lithium ion batteries and nickel hydrogen batteries. The electrical storage device 150 stores electric power supplied from the DC/DC converter 140 and the electric power generated by the electric motor 170 during regenerative braking. The electrical storage device 150 supplies the stored electric power to the PCU 160. A high-capacitance capacitor may be used as the electrical storage device 150. The electrical storage device 150 is not limited as long as it functions as an electric power buffer that can temporarily store the electric power supplied from the power supply apparatus 200 and the regenerated electric power generated by the electric motor 170 and supply the stored electric power to the PCU 160.

The PCU 160 drives the electric motor 170 with the electric power output from the electrical storage device 150 or the electric power directly supplied from the DC/DC converter 140. The PCU 160 converts the regenerated electric power (AC power) generated by the electric motor 170 to DC power to output the DC power to the electrical storage device 150, thereby charging the electrical storage device 150. The motor 170 is driven by the PCU 160 and generates the vehicle driving power to output the driving power to the driving wheels. The electric motor 170 generates electricity with the use of the kinetic energy received from the driving wheels and, in the case of a hybrid vehicle, from the engine (not shown), and outputs the generated electric power, including the regenerated electric power, to the PCU 160.

Although not shown in FIG. 1, the vehicle ECU 180 includes a central processing unit (CPU), a storage device, and an input/output buffer, receives signals from various sensors, outputs control signals to various devices, and controls the vehicle 100 and the various devices. Note that the means for performing these control operations is not limited to processing by software but may be processing using a dedicated hardware device (electronic circuitry). Although in FIG. 1, the vehicle ECU 180 is configured to perform both the driving control of the vehicle 100 and the power receiving control to receive power from the power supply apparatus 200, the configuration of the controller is not limited to this. Specifically, a configuration may be employed, in which the vehicle 100 includes a controller for each device or for each function. For example, the vehicle 100 may include a power receiving ECU that mainly performs power receiving control.

The vehicle ECU 180 controls the DC/DC converter 140 when electric power is supplied from the power supply apparatus 200 to the vehicle 100. The vehicle ECU 180 controls the voltage between the rectifier 130 and the DC/DC converter 140 to a predetermined target voltage by controlling the DC/DC converter 140, for example. The vehicle ECU 180 also controls the PCU 160 based on the driving conditions of the vehicle and the state of charge (SOC) of the electrical storage device 150 while the vehicle is running.

The power supply apparatus 200 includes an AC power supply 210, a high-frequency AC power driver 220, and a coil unit 201. The coil unit 201 includes a primary electromagnetic induction coil 230, a primary resonance coil 240, and a capacitor 245 provided for the primary resonance coil 240.

The AC power supply 210 is a power supply provided externally to the vehicle, which is, for example, a commercial power source. The high-frequency AC power driver 220 converts the electric power received from the AC power supply 210 to a high-frequency AC power and supplies the high-frequency AC power to the primary electromagnetic induction coil 230. The frequency of the high-frequency AC power generated by the high-frequency AC power driver 220 is, for example, one megahertz to several dozen megahertz.

The primary electromagnetic induction coil 230 is provided coaxially with the primary resonance coil 240 and can be magnetically coupled to the primary resonance coil 240 via electromagnetic induction. The primary electromagnetic induction coil 230 supplies, to the primary resonance coil 240 via electromagnetic induction, the high-frequency AC power supplied from the high-frequency AC power driver 220.

The primary resonance coil 240 is disposed near the ground surface, for example. The primary resonance coil 240 is an LC resonator as in the case of the secondary resonance coil 110 and transmits or receives electric power to or from the electric vehicle 100 by resonating with the secondary resonance coil 110 of the vehicle 100 via electromagnetic field. Although for the capacitive component of the secondary resonance coil 240, a capacitor 245 is provided for the secondary resonance coil 240 in order to obtain a predetermined capacitance, the capacitor 245 is not necessary when the parasitic capacitance of the primary resonance coil 240 suffices.

The primary resonance coil 240 is also formed based on the distance between the primary resonance coil 240 and the secondary resonance coil 110 of the vehicle 100, the resonance frequency of the primary resonance coil 240 and the secondary resonance coil 110, etc. so that the Q factor (Q>100, for example), the degree of coupling, κ, etc. become large.

Figure 2:
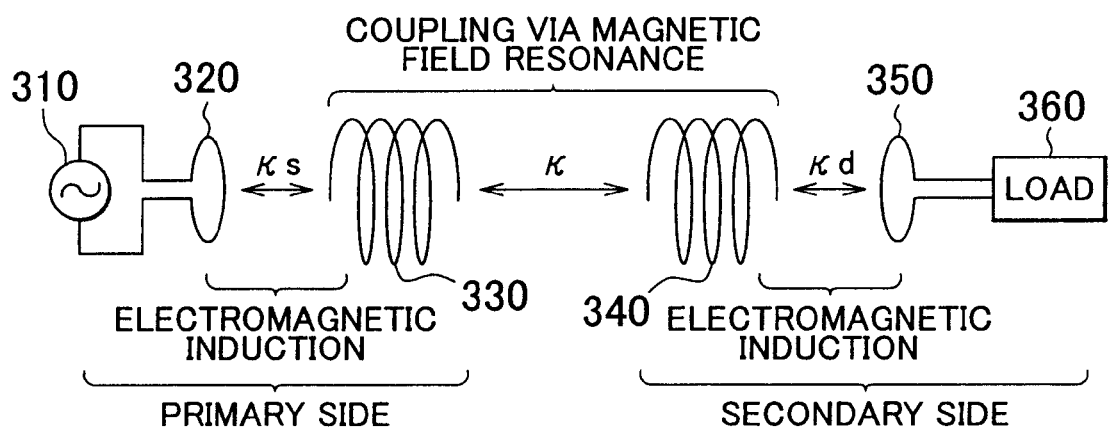
FIG. 2 is a diagram for explaining the principle of electric power transmission using the resonance method.

FIG. 2 is a diagram for explaining the principle of electric power transmission using the resonance method. Referring to FIG. 2, in the resonance method, as in the case of the resonance of two tuning forks, electric power is transmitted from one coil to the other coil via electromagnetic field due to the resonance of two LC resonators having the same eigenfrequency in the electromagnetic field (near field).

Specifically, a primary electromagnetic induction coil 320 is connected to a high-frequency AC power supply 310 and the high-frequency AC power of one megahertz to several dozen megahertz is supplied, via electromagnetic induction, to a primary resonance coil 330 that is magnetically coupled to the primary electromagnetic induction coil 320. The primary resonance coil 330 is an LC resonator using the inductance of the coil itself and the parasitic capacitance, which includes the capacitance of a capacitor when the capacitor is connected to the coil, and the primary resonance coil 330 resonates with a secondary resonance coil 340 having the resonance frequency the same as that of the primary resonance coil 330 via electromagnetic field (near field). As a result, energy (electric power) is transferred from the primary resonance coil 330 to the secondary resonance coil 340 via electromagnetic field. The energy (electric power) transferred to the secondary resonance coil 340 is received, via electromagnetic induction, by a secondary electromagnetic induction coil 350 that is magnetically coupled to the secondary resonance coil 340, and is then supplied to a load 360. The electric power transmission by the resonance method is performed when the Q factor that indicates the intensity of resonance of the primary resonance coil 330 and the secondary resonance coil 340 is greater than 100, for example.

The correspondences between FIG. 1 and FIG. 2 will now be explained. The AC power supply 210 and the high-frequency AC power driver 220 in FIG. 1 correspond to the high-frequency AC power supply 310 in FIG. 2. The primary electromagnetic induction coil 230 and the primary resonance coil 240 in FIG. 1 correspond to the primary electromagnetic induction coil 320 and the primary resonance coil 330 in FIG. 2. The secondary resonance coil 110 and the secondary electromagnetic induction coil 120 in FIG. 1 correspond to the secondary resonance coil 340 and the secondary electromagnetic induction coil 350 in FIG. 2. The devices from the rectifier 130 to the motor 170 in FIG. 1 are collectively represented by the load 360 in FIG. 2.

Figure 3:
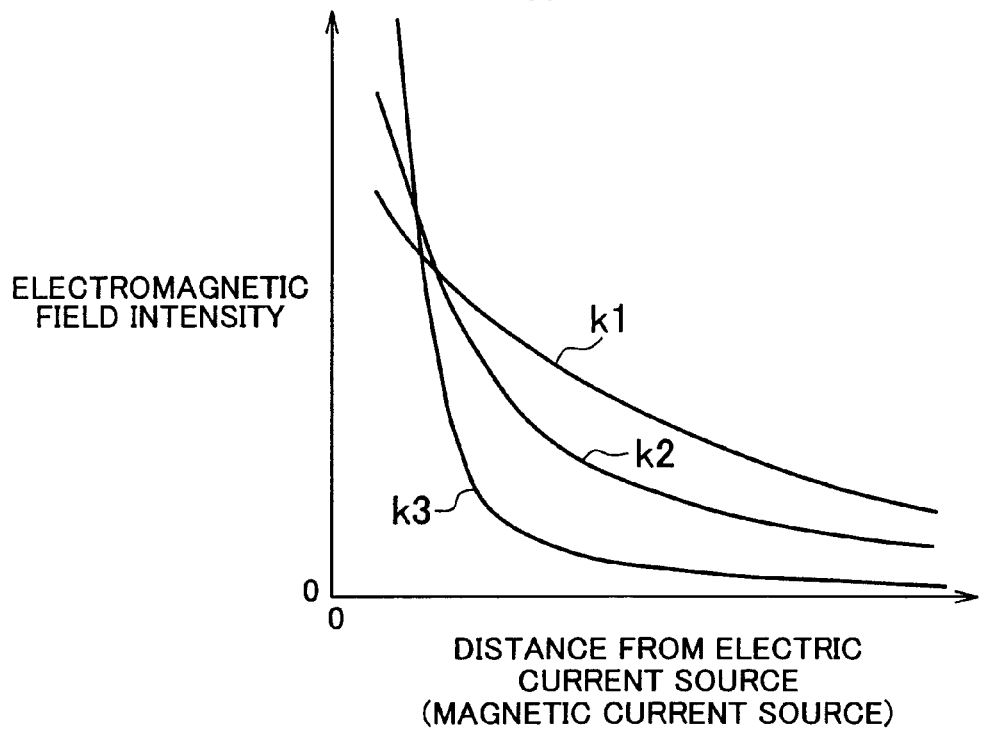
FIG. 3 is a diagram showing relations between the distance from an electric current source (magnetic current source) and the intensity of electromagnetic field.

FIG. 3 is a diagram showing relations between the distance from the electric current source (magnetic current source) and the intensity of the electromagnetic field. Referring to FIG. 3, the electromagnetic field includes three components. The curve k1 represents a component that is inversely proportional to the distance from the electromagnetic wave source and is called "radiation field". The curve k2 represents a component that is inversely proportional to the square of the distance from the electromagnetic wave source and is called "induction field". The curve k3 represents a component that is inversely proportional to the cube of the distance from the electromagnetic wave source and is called "static electromagnetic field".

Figure 4:
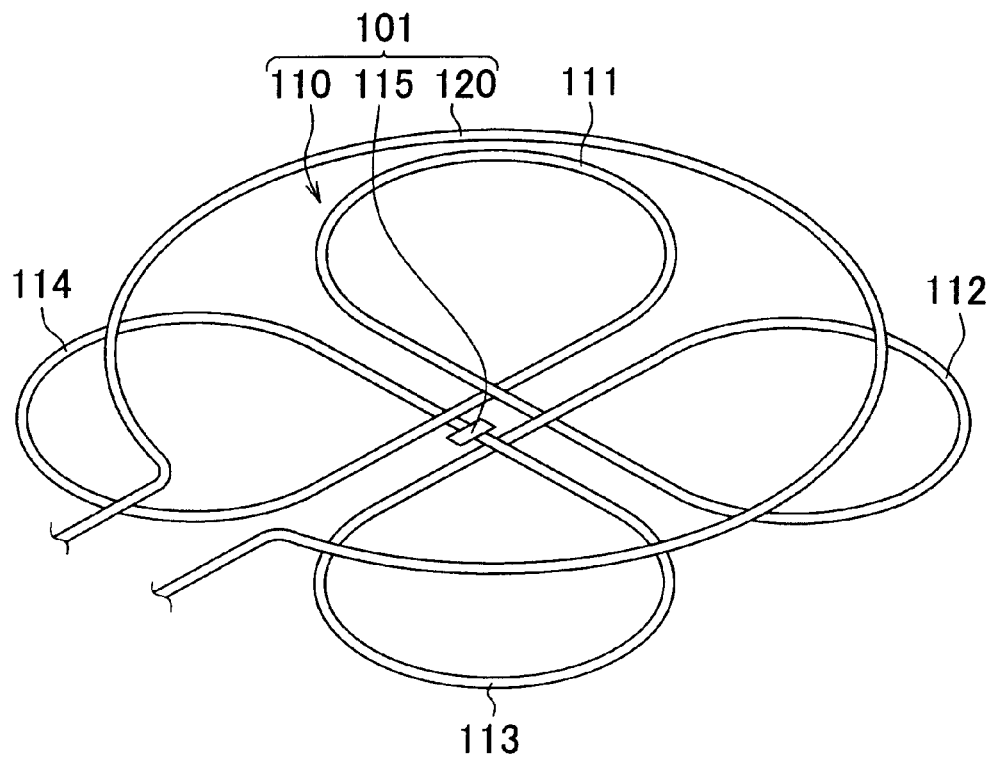
FIG. 4 is a perspective view schematically showing a coil unit 101 mounted on a vehicle.

The "static electromagnetic field" is a component, the intensity of which steeply decreases with the distance from the electromagnetic wave source, and this near field (evanescent field) that is dominated by the "static electromagnetic field" is used to transmit the energy (electric power) in the resonance method. Specifically, by causing a pair of resonators (a pair of LC resonators, for example) having the same eigenfrequency to resonate with each other in the near field, in which the "static electromagnetic field" is dominant, energy (electric power) is transmitted from one resonator (primary resonance coil) to the other resonator (secondary resonance coil). Because the "static electromagnetic field" does not transmit energy far away, the resonance method can transmit energy with lower energy loss as compared to the case where electromagnetic waves are used that transmit energy (electric power) with the use of the "radiation field" that transmits energy far away. FIG. 4 is a perspective view schematically showing the coil unit 101 mounted on the vehicle. As shown in FIG. 4, the coil unit 101 includes the secondary resonance coil 110, the secondary electromagnetic induction coil 120, and a capacitor 115 provided for the secondary resonance coil 110. The secondary resonance coil 110 includes a plurality of unit coils 111, 112, 113, and 114. The unit coils 111 to 114 are arranged so as to be adjacent to each other.

The secondary resonance coil 110 is formed of a conducting wire, which is wound to form the unit coils 111 to 114. Thus, the systems for supplying electric power to the unit coils 111 to 114 or the systems for receiving electric power from the unit coils 111 to 114 can be integrated into one system. In the example shown in FIG. 4, one secondary electromagnetic induction coil 120 receives electric power from the unit coils 111 to 114 or transmits electric power to the unit coils 111 to 114. The number of turns of each of the unit coils 111 to 114 is set to one to reduce the size of the secondary resonance coil 110 in the vertical direction.

Figure 5:
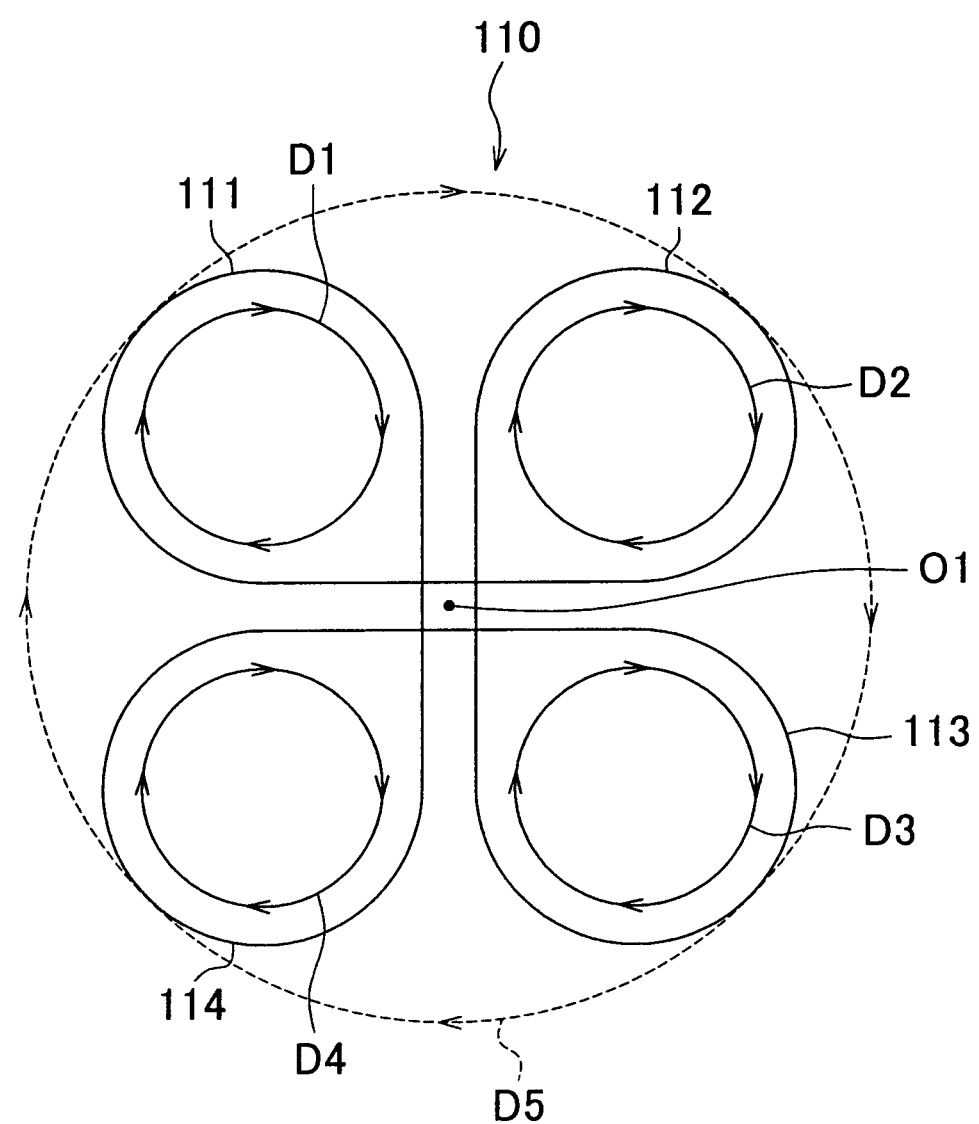
FIG. 5 is a plan view schematically showing a secondary resonance coil 110.

FIG. 5 is a plan view schematically showing the secondary resonance coil 110. The unit coils 111 to 114 are annularly arranged around the imaginary center line O1 of the secondary resonance coil 110 so as to be rotationally symmetric with respect to the imaginary center line O1. In the example shown in FIGS. 4 and 5, the four unit coils are arranged around the imaginary center line O1 so as to be rotationally symmetric with respect to the imaginary center line O1. The unit coils 111 to 114 are arranged in the same imaginary plane. The number of unit coils is not limited to four and it suffices that at least two unit coils are provided.

The directions D1 to D4 in FIG. 5 schematically show the directions, in which the electric current flows in the secondary resonance coil 110 during reception or transmission of electric power. In FIG. 5, the winding directions of the unit coils 111 to 114 are the same, so that the directions D1 to D4, in which electric current flows in the unit coils 111 to 114 during reception or transmission of electric power, are the same. Regarding the entirety of the secondary resonance coil 110, the electric current can be approximated by the electric current flowing in a one-turn coil in the direction D5.

When electric current flows in the unit coils 111 to 114 in the same direction, the directions of the magnetic fields generated by the unit coils 111 to 114 are the same and a near field is formed by the flow of the electric current in the unit coils 111 to 114, whose frequency is set to the resonance frequency of the secondary resonance coil 110.

Figure 6:
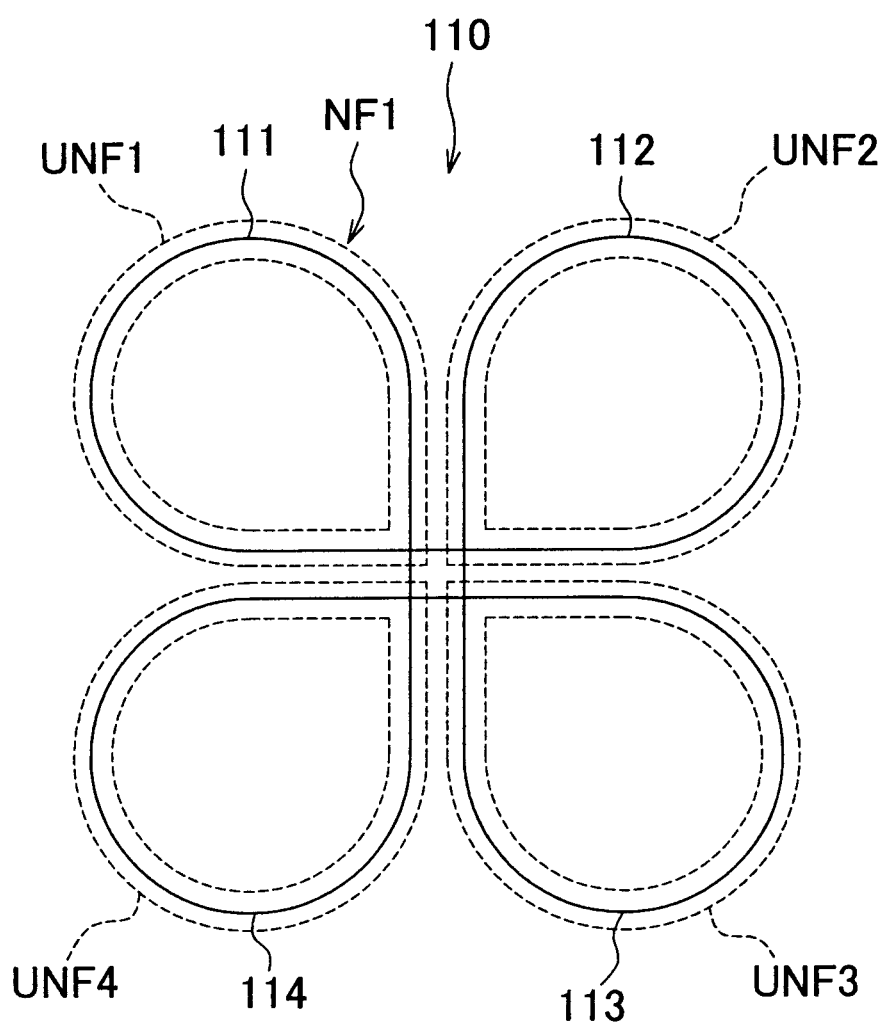
FIG. 6 is a plan view schematically showing a situation where an electric current, whose frequency is set to the resonance frequency of the secondary resonance coil 110, flows in the secondary resonance coil 110.

FIG. 6 is a plan view schematically showing a situation where the electric current, whose frequency is set to the resonance frequency of the secondary resonance coil 110, flows in the secondary resonance coil 110.

As shown in FIG. 6, a near field NF1 is formed around the secondary resonance coil 110 by the flow of the electric current in the secondary resonance coil 110, whose frequency is equal to the resonance frequency. The near field NF1 includes a unit near field UNF1 formed around the unit coil 111, a unit near field UNF2 formed around the unit coil 112, a unit near field UNF3 formed around the unit coil 113, and a unit near field UNF4 formed around the unit coil 114. The area, in which the near field is formed, shown in FIG. 6 merely shows the area, in which the intensity of the near field is high, in a schematic manner.

FIG. 7 is a perspective view schematically showing the coil unit 201 mounted in the power supply apparatus 200. As shown in FIG. 7, the coil unit 201 includes the primary electromagnetic induction coil 230, the primary resonance coil 240, and the capacitor 245 provided for the primary resonance coil 240. Note that the primary electromagnetic induction coil 230 and the secondary electromagnetic induction coil 120 are not necessary in the non-contact power supply system using electromagnetic resonance according to the embodiment.

The primary resonance coil 240 includes a plurality of unit coils 241, 242, 243, and 244, which are arranged so as to be adjacent to each other. The primary resonance coil 240 and the secondary resonance coil 110 are formed so as to have substantially the same shape and the resonance frequency of the primary resonance coil 240 and the resonance frequency of the secondary resonance coil 110 are equal to each other.

The primary resonance coil 240 is formed of a conducting wire, which is wound to form the unit coils 241 to 244. The number of turns of each of the unit coils 241 to 244 is set to one to reduce the size of the primary resonance coil 240 in the vertical direction.

Figure 8:
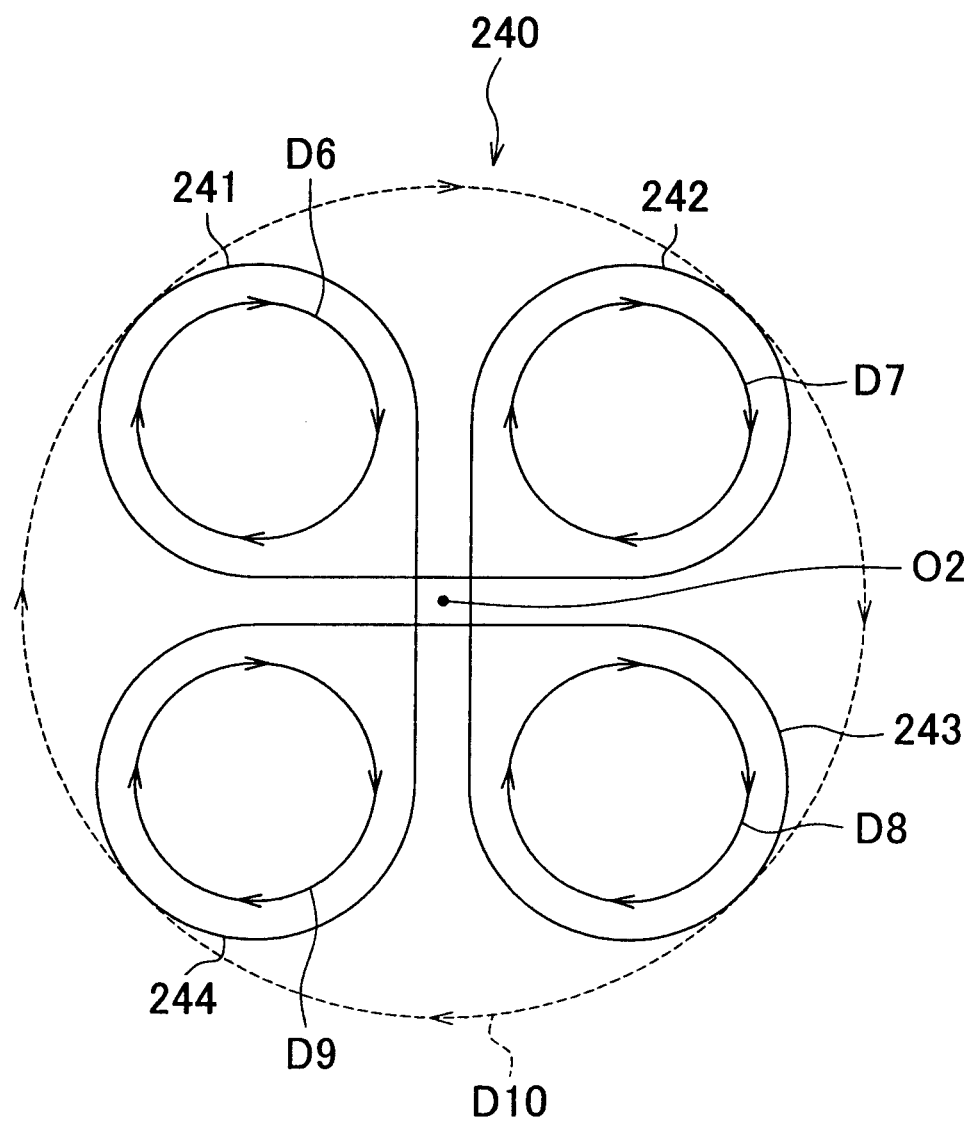
FIG. 8 is a plan view schematically showing a primary resonance coil 240.

FIG. 8 is a plan view schematically showing the primary resonance coil 240. As shown in FIG. 8, the unit coils 241 to 244 are annularly arranged around the imaginary center line O2 so as to be rotationally symmetric with respect to the imaginary center line O2. Also in the example shown in FIGS. 7 and 8, the four unit coils 241 to 244 are symmetrically arranged. The unit coils 241 to 244 are also arranged in the same imaginary plane.

Figure 9:
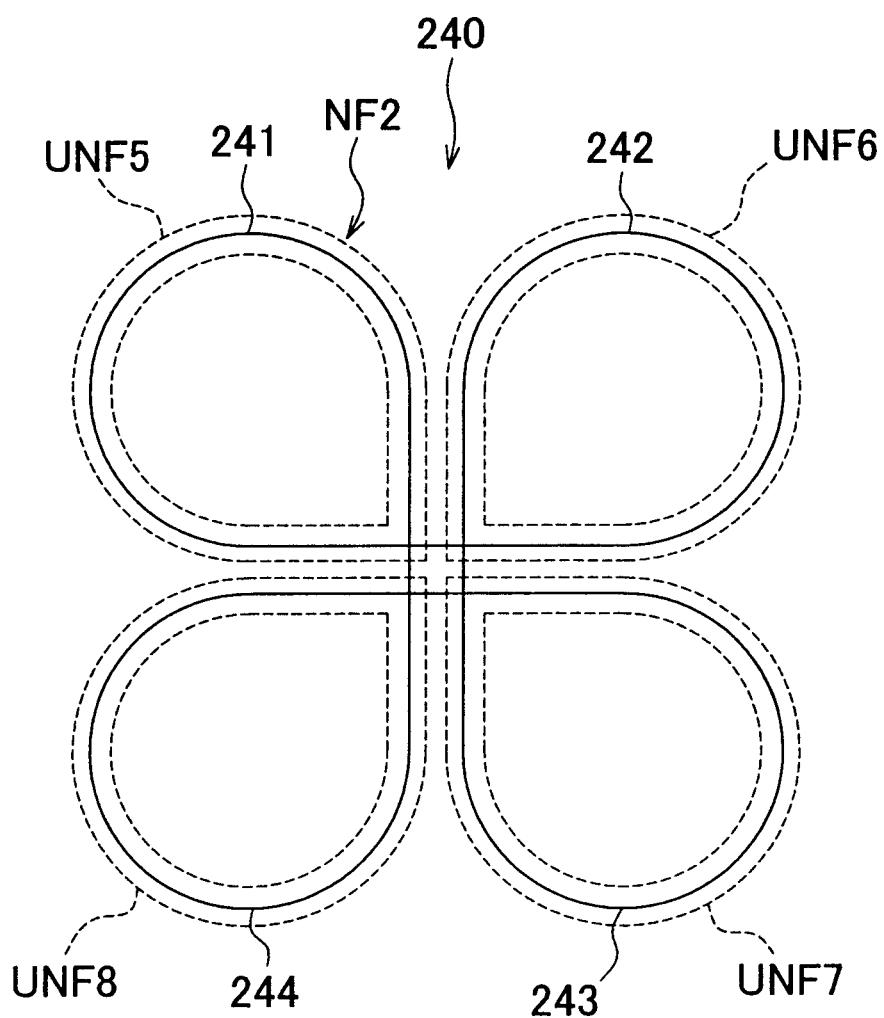
FIG. 9 is a plan view schematically showing a situation where an electric current, whose frequency is set to the resonance frequency of the primary resonance coil 240, flows in the primary resonance coil 240.

The directions D6 to D9 in FIG. 8 schematically show the directions, in which the electric current flows in the primary resonance coil 240 during reception or transmission of electric power. In FIG. 9, the winding directions of the unit coils 241 to 244 are the same, so that the directions D6 to D9, in which electric current flows in the unit coils 241 to 244 during reception or transmission of electric power, are the same. Regarding the entirety of the primary resonance coil 240, the electric current can be approximated by the electric current flowing in a one-turn coil in the direction D10.

When electric current flows in the unit coils 241 to 244 in the same direction, the directions of the magnetic fields generated by the unit coils 241 to 244 are the same. A near field is formed by the flow of the electric current in the unit coils 241 to 244, whose frequency is set to the resonance frequency of the primary resonance coil 240.

FIG. 9 is a plan view schematically showing a situation where the electric current, whose frequency is set to the resonance frequency of the primary resonance coil 240, flows in the primary resonance coil 240.

As shown in FIG. 9, a near field NF2 is formed around the primary resonance coil 240 by the flow of the electric current in the primary resonance coil 240, whose frequency is set to the resonance frequency. The near field NF2 includes a unit near field UNF5 formed around the unit coil 241, a unit near field UNF6 formed around the unit coil 242, a unit near field UNF7 formed around the unit coil 243, and a unit near field UNF8 formed around the unit coil 244.

Figure 10:
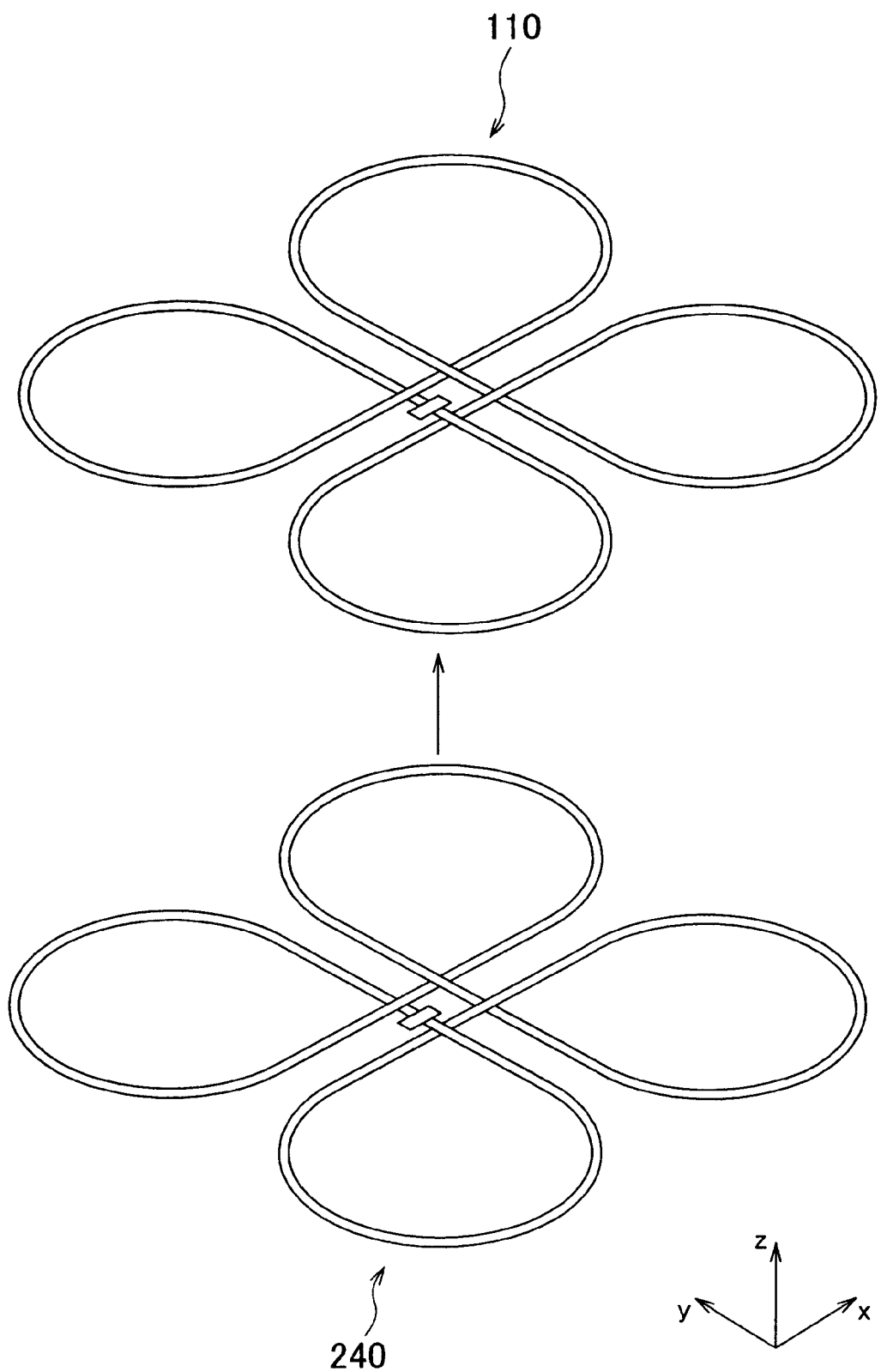
FIG. 10 is a perspective view schematically showing the relative positional relationship between the secondary resonance coil 110 and the primary resonance coil 240 when an electrical storage device 150 of a vehicle 100 is charged.

FIG. 10 is a perspective view schematically showing the relative positional relationship between the secondary resonance coil 110 and the primary resonance coil 240 when the electrical storage device 150 of the vehicle 100 is charged.

When the electrical storage device 150 is charged, the vehicle 100 is stopped over the power supply apparatus 200 so that the secondary resonance coil 110 is positioned over the primary resonance coil 240.

Then, an AC current, whose frequency is set to the resonance frequency, flows in the primary resonance coil 240 and the near field NF2 as shown in FIG. 9 is formed.

Figure 11:
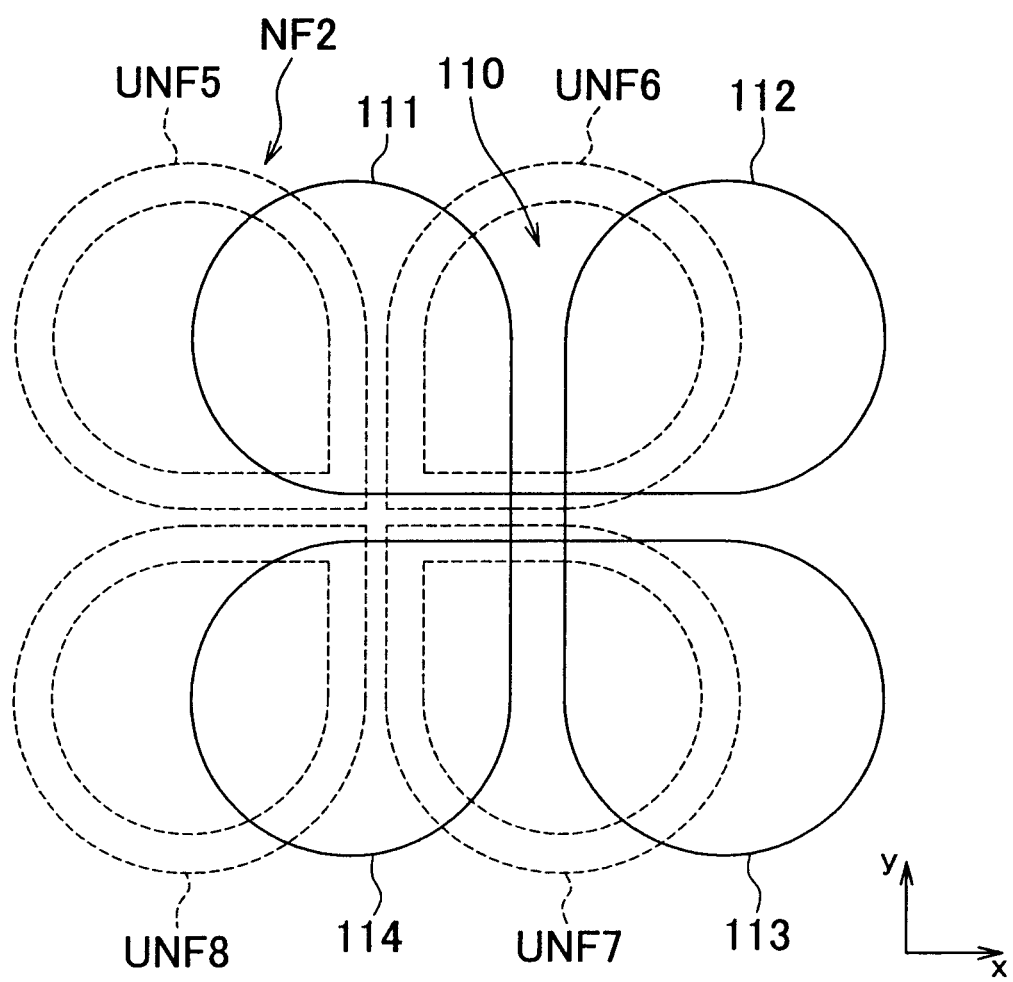
FIG. 11 is a schematic plan view of a near field NF2 and the secondary resonance coil 110 when viewed from above.

FIG. 11 is a schematic plan view of the near field NF2 and the secondary resonance coil 110 when viewed from above. In FIG. 11, the secondary resonance coil 110 and the primary resonance coil 240 do not coincide with each other in horizontal direction, that is, these coils are offset from each other in the "x" direction.

Figure 12:
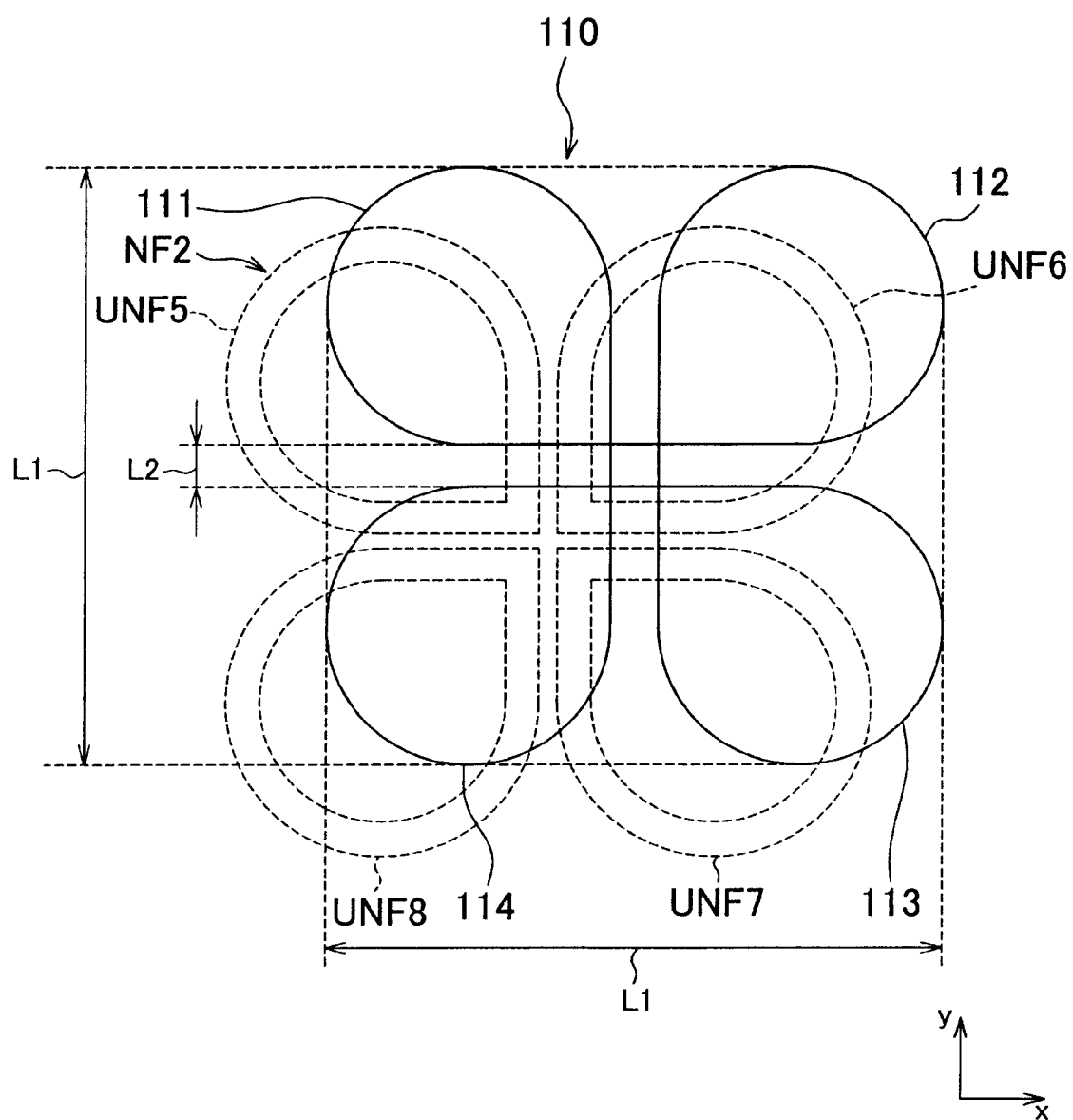
FIG. 12 is a schematic plan view of the near field NF2 and the secondary resonance coil 110 when viewed from above.

FIG. 12 is also a schematic plan view of the near field NF2 and the secondary resonance coil 110 when viewed from above. In FIG. 12, the secondary resonance coil 110 and the primary resonance coil 240 are offset from each other in both the "x" direction and the "y" direction.

Figure 13:
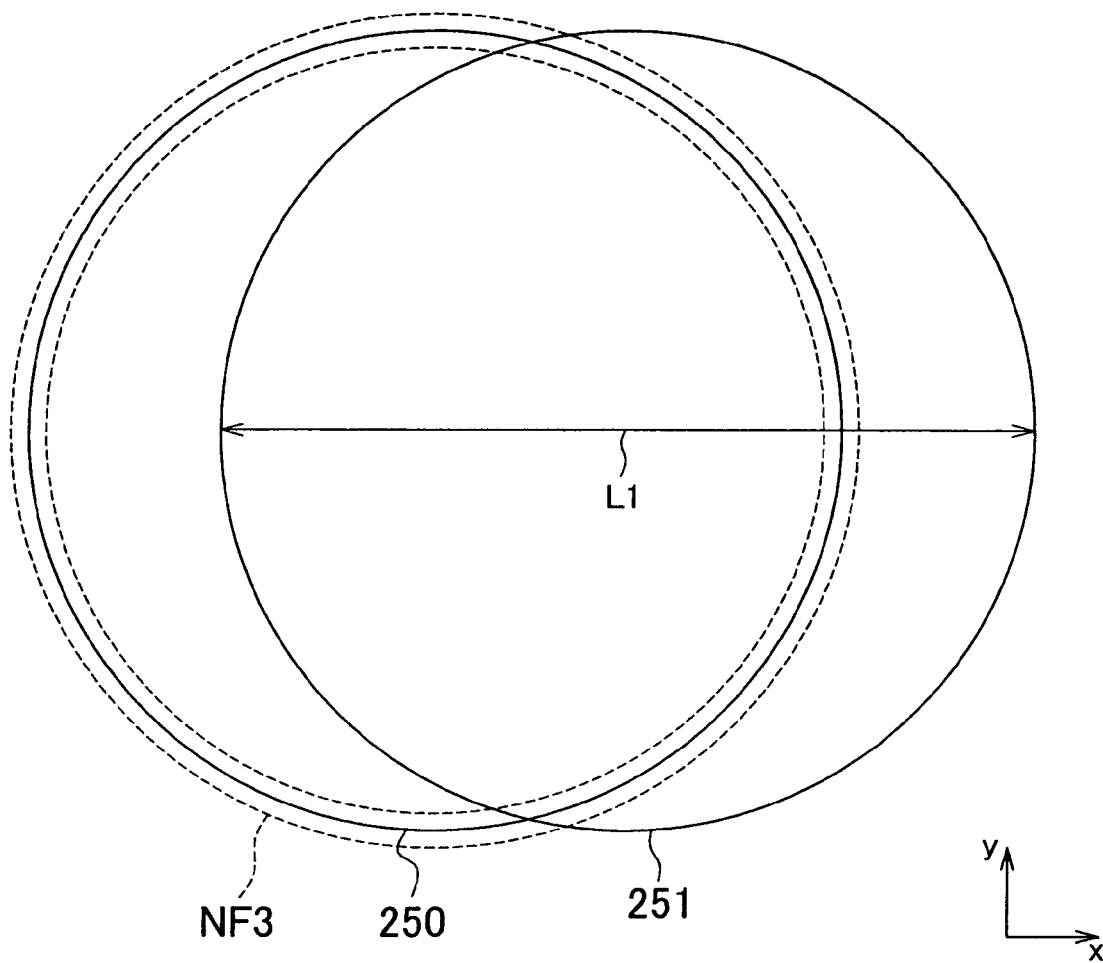
FIG. 13 is a plan view schematically showing the power supply system according to a comparative example.

A description will now be given of why it is possible to maintain a high charging efficiency with the use of the coil unit according to the embodiment even when two resonance coils are offset from each other, referring to a comparative example. FIG. 13 is a plan view schematically showing a power supply system, which is a comparative example.

A power supply system according to the comparative example includes a circular primary resonance coil 250 and a circular secondary resonance coil 251, which have the same diameter. As shown in FIG. 13, an AC current, whose frequency is equal to the resonance frequency, is caused to flow in the primary resonance coil 250, so that a near field NF3 is formed around the primary resonance coil 250. The primary resonance coil 250 and the secondary resonance coil 251 are offset from each other in the direction, x, in the drawing.

First, the secondary resonance coil 110 shown in FIG. 11 and the secondary resonance coil 251 shown in FIG. 13 are compared with each other.

Regarding the intersections of the secondary resonance coil 251 and the near field NF3 shown in FIG. 13, in plan view, these intersect each other at two points. On the other hand, regarding the intersections of the secondary resonance coil 110 and the near field NF2 shown in FIG. 11, it is clear that there are at least three intersections.

In addition, as shown in FIG. 12, also in the case where the secondary resonance coil 110 is offset not only in the "x" direction but also in the "y" direction, regarding the intersections of the secondary resonance coil 110 and the near field NF2, it is clear that there are at least three intersections.

As described above, with the use of a coil unit according to the embodiment, even when the secondary resonance coil and the primary resonance coil are offset in a direction in the horizontal plane, the amount of portion of the secondary resonance coil that passes through the near field formed by the primary resonance coil, so that it is possible to suppress reduction of the power reception efficiency. As a result, it is possible to maintain high efficiency in charging the electrical storage device mounted on the vehicle.

In the example shown in FIGS. 11 and 12, in order to charge the electrical storage device 150 mounted on the vehicle 100, electric power with the resonance frequency is supplied to the primary resonance coil 240 to form the near field NF2, via which the secondary resonance coil 110 is caused to receive the electric power.

Alternatively, in order to supply the electric power stored in the electrical storage device 150 to the power supply apparatus 200, an AC current with the resonance frequency may be caused to flow in the secondary resonance coil 110 to form the near field NF1 and the primary resonance coil 240 may be caused to receive the electric power via the near field NF1.

Also in this case, as in the case of the examples shown in FIGS. 11 and 12, even when the secondary resonance coil 110 and the primary resonance coil 240 are relatively offset from each other, the number of the intersections of the secondary resonance coil 110 and the near field NF1 is at least three. Thus, it is possible to maintain high efficiency in transmitting electric power from the electrical storage device 150 to the power supply apparatus 200.

In addition, although, in the description of the example shown in FIGS. 11 and 12, the example has been described, in which a resonance coil including a plurality of unit coils is used as each of the secondary resonance coil 110 and the primary resonance coil 240, a configuration may be employed, in which only one of the secondary resonance coil 110 and the primary resonance coil 240 is a resonance coil including a plurality of unit coils.

Figure 14:
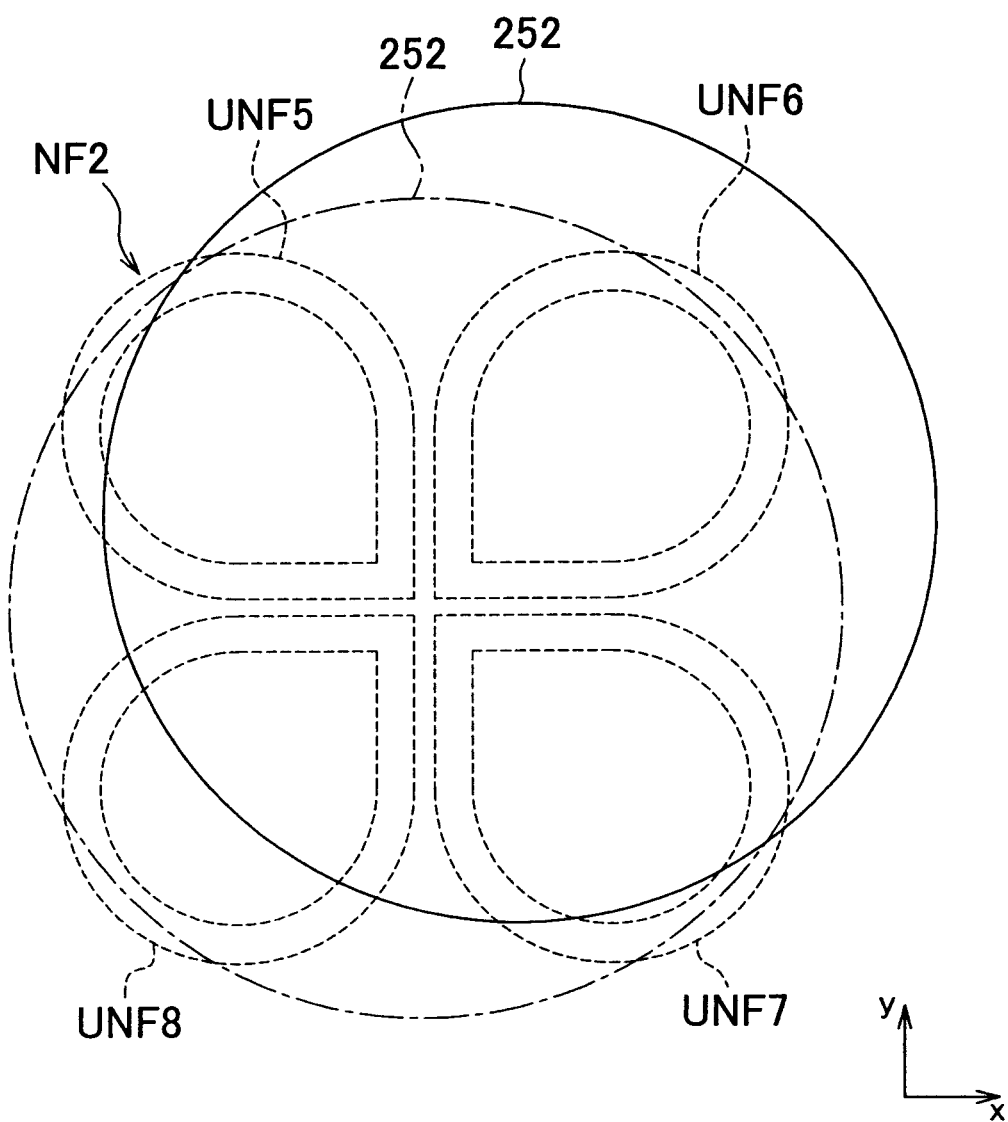
FIG. 14 is a plan view schematically showing an example, in which a circular resonance coil is used as the secondary resonance coil.

FIG. 14 is a plan view schematically showing an example, in which a circular resonance coil is used as the secondary resonance coil. In FIG. 14, the secondary resonance coil 252 represented by the chain line is the secondary resonance coil 252 in a normally positioned state and the secondary resonance coil 252 represented by the solid line is the secondary resonance coil 252 that is offset from the position reached when the positioning is normally done.

As can be seen from FIG. 14, it is clear that the number of intersections of the secondary resonance coil 252 represented by the solid line and the near field NF2 is at least three. Thus, it can be understood that also in the example shown in FIG. 14, it is possible to maintain power reception efficiency and power transmission efficiency at a high level even when the resonance coils are relatively offset from each other.

Figure 15:
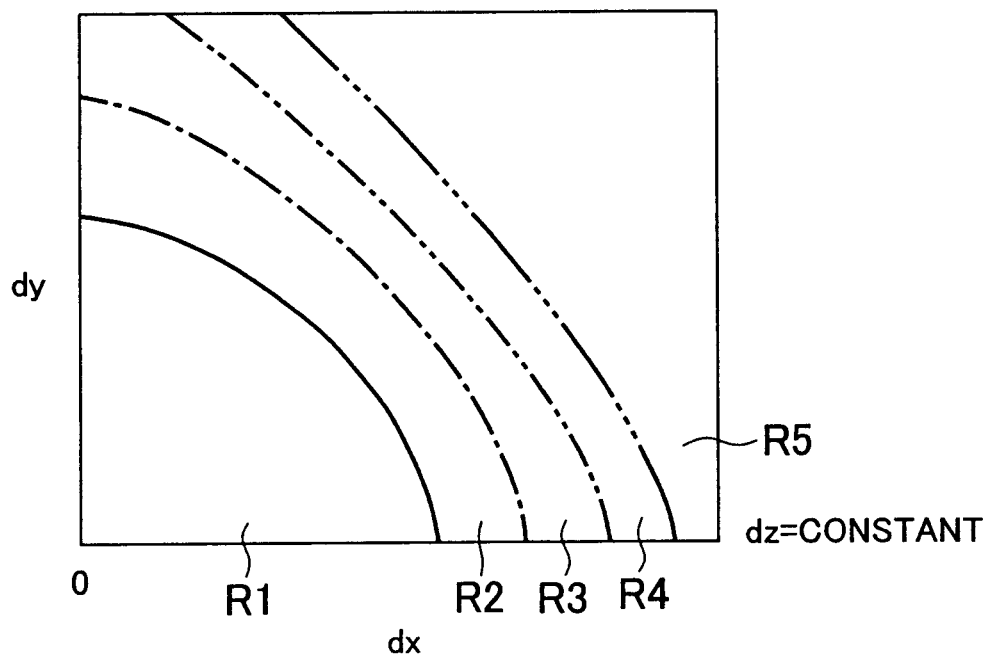
FIG. 15 is a graph of the results of a simulation to obtain the transmission efficiency in the power supply system shown in FIGS. 1, 10, and 12.
Figure 16:
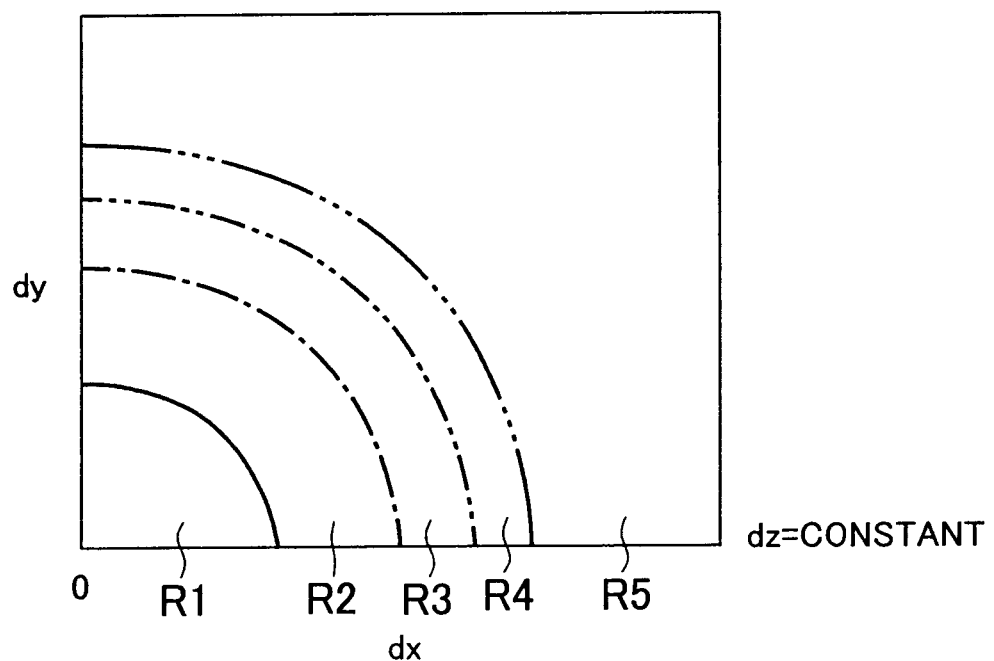
FIG. 16 is a graph of the results of a simulation to obtain the transmission efficiency in the power supply system shown in FIG. 13.

FIG. 15 is a graph of the results of a simulation to obtain the transmission efficiency in the power supply system shown in FIGS. 1, 10, and 12. FIG. 16 is a graph of the results of a simulation to obtain the transmission efficiency in the power supply system shown in FIG. 13.

Note that the length and width of the secondary resonance coil 110 shown in FIG. 12 are L1 and that the primary resonance coil 240 and the secondary resonance coil 110 have the same shape. The value of L2 shown in FIG. 12 is approximately 1 mm if the value of L1 is approximately 1 m, for example. In FIG. 13, the diameters of both the secondary resonance coil 251 and the primary resonance coil 250 are L1.

As the simulation software, FEKO (three-dimensional electromagnetic simulation software made by EM Software & Systems-S.A. (Pty) Ltd. (EMSS-SA)) is used.

In FIGS. 15 and 16, the horizontal axis indicates the amount of positional deviation, "dx", in the "x" direction and the vertical axis indicates the amount of positional deviation, "dy", in the "y" direction. As shown in FIGS. 15 and 16, the distance, "dz", between the primary resonance coil and the secondary resonance coil in the vertical direction (the "z" direction in FIG. 10) is constant in both cases (0.2 m, for example). The distance between the primary resonance coil 250 and the secondary resonance coil 251 in the vertical direction in FIG. 13 and the distance between the primary resonance coil 110 and the secondary resonance coil 240 in the vertical direction in FIGS. 10 and 12 are equalized.

In FIGS. 15 and 16, the region R1 is the region of the highest transmission efficiency, and the transmission efficiency decreases in the order of the region R2, the region R3, the region R4, and the region R5. As can be seen from FIGS. 15 and 16, the area of the region R1 shown in FIG. 15 is larger than the area of the region R1 shown in FIG. 16.

Thus, it can be understood that the power supply system shown in FIGS. 10 and 12 is superior in maintaining power supply efficiency at a high level when there is a positional deviation.

While an example has been described, in which the shape of the unit coil is a circle or a shape resembling a circle, in the above description of the example, the shape of the unit coil is not limited to this.

Figure 17:
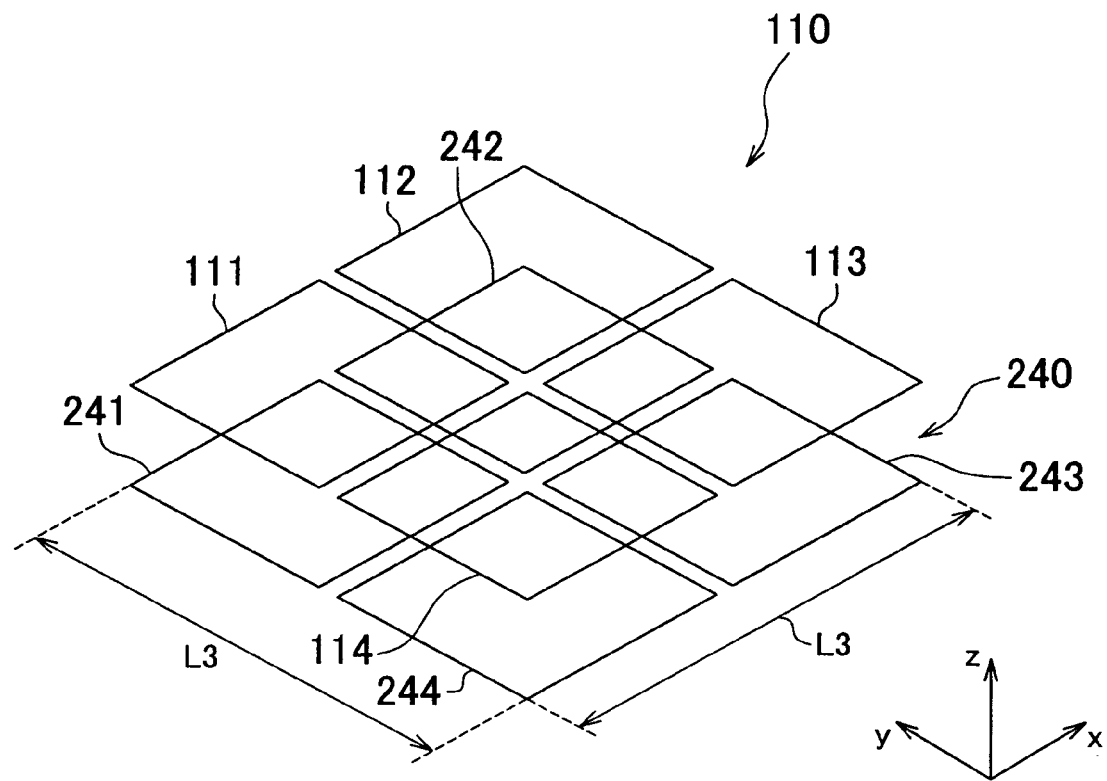
FIG. 17 is a perspective view schematically showing a modification of the secondary resonance coil 110 and the primary resonance coil 240.

For example, FIG. 17 is a perspective view schematically showing a modification of the secondary resonance coil 110 and the primary resonance coil 240. In the example shown in FIG. 17, the unit coils 111 to 114 of the secondary resonance coil 110 have a rectangular shape and the unit coils 241 to 244 of the primary resonance coil 240 also have a rectangular shape. Each of the unit coils 111 to 114 and 241 to 244 has a square shape, the sides of which have the same length.

Figure 18:
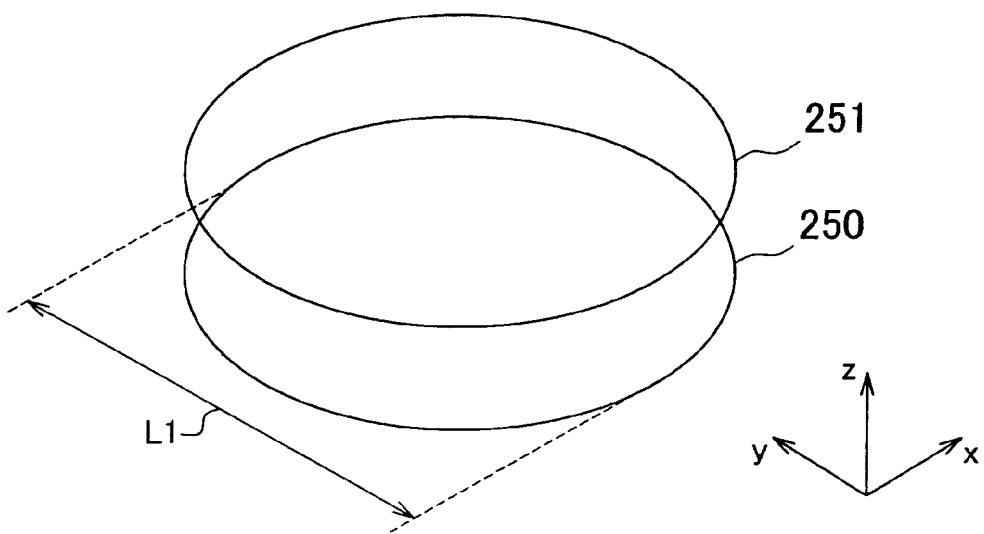
FIG. 18 is a perspective view schematically showing the power supply system shown in FIG. 13.
Figure 19:
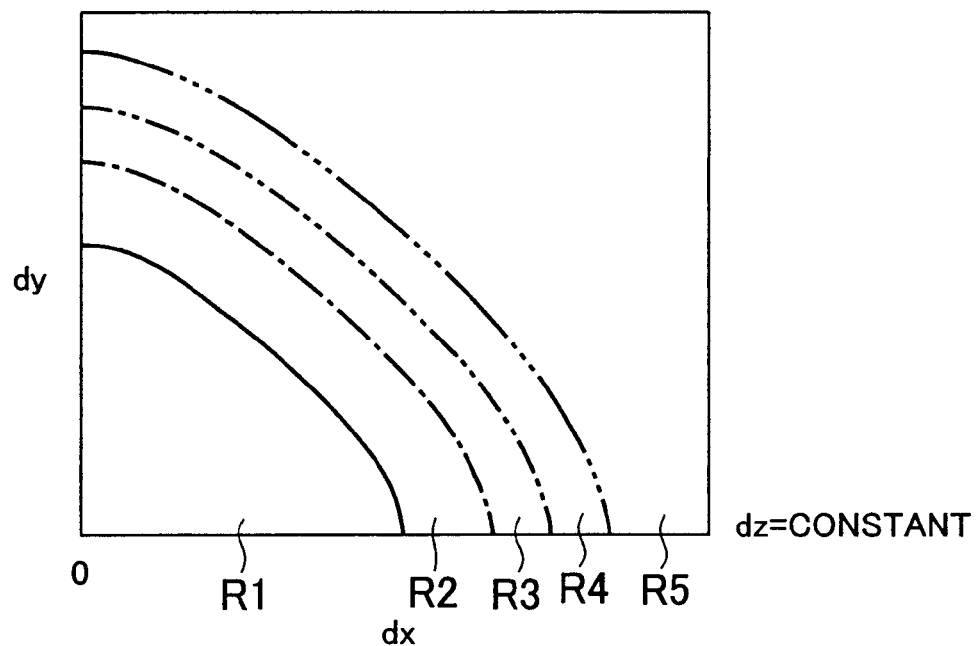
FIG. 19 is a graph showing transmission efficiency of the power supply system shown in FIG. 17.
Figure 20:
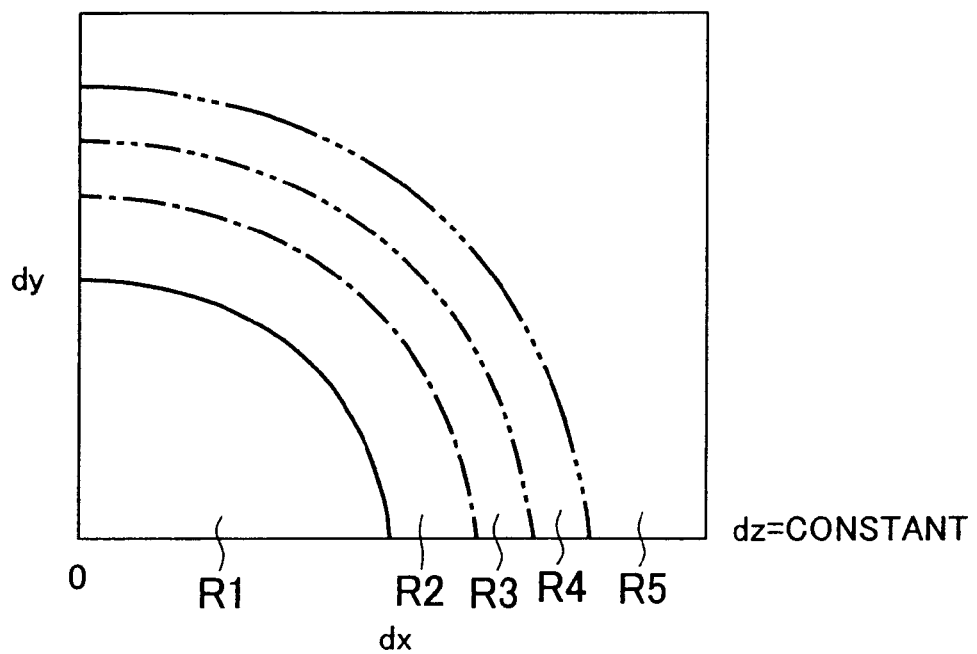
FIG. 20 is a graph showing transmission efficiency of the power supply system shown in FIG. 18.

FIG. 18 is a perspective view schematically showing the power supply system shown in FIG. 13 as the comparative example. FIG. 19 is a graph showing transmission efficiency of a power supply system shown in FIG. 17. FIG. 20 is a graph showing transmission efficiency of a power supply system shown in FIG. 18.

The graph shown in FIG. 20 shows the transmission efficiency when the diameter L1 of the primary resonance coil 250 and the secondary resonance coil 251 shown in FIG. 18 is 1 m and the distance, dz, between the primary resonance coil 250 and the secondary resonance coil 251 in the vertical direction is 0.145 m.

As a result of adjusting the length, L3, shown in FIG. 17 so that the regions, such as the regions R1 and R2 shown in FIG. 19, in which the transmission efficiency is high, and the regions, such as the regions R1 and R2 shown in FIG. 20, in which the transmission efficiency is high coincide with each other, the regions shown in FIG. 19, in which the transmission efficiency is high, are made to coincide with the regions shown in FIG. 20, in which the transmission efficiency is high, by setting L3 to 0.8 m.

The secondary resonance coil 110, the length of one side of which is set to 0.8 m, is smaller than the secondary resonance coil 251, of which the diameter shown in FIG. 18 is set to 1 m. In this way, it has been found that if the transmission efficiency is the same, the size of the resonance coil is reduced when the resonance coil including the plurality of unit coils is used.

Figure 21:
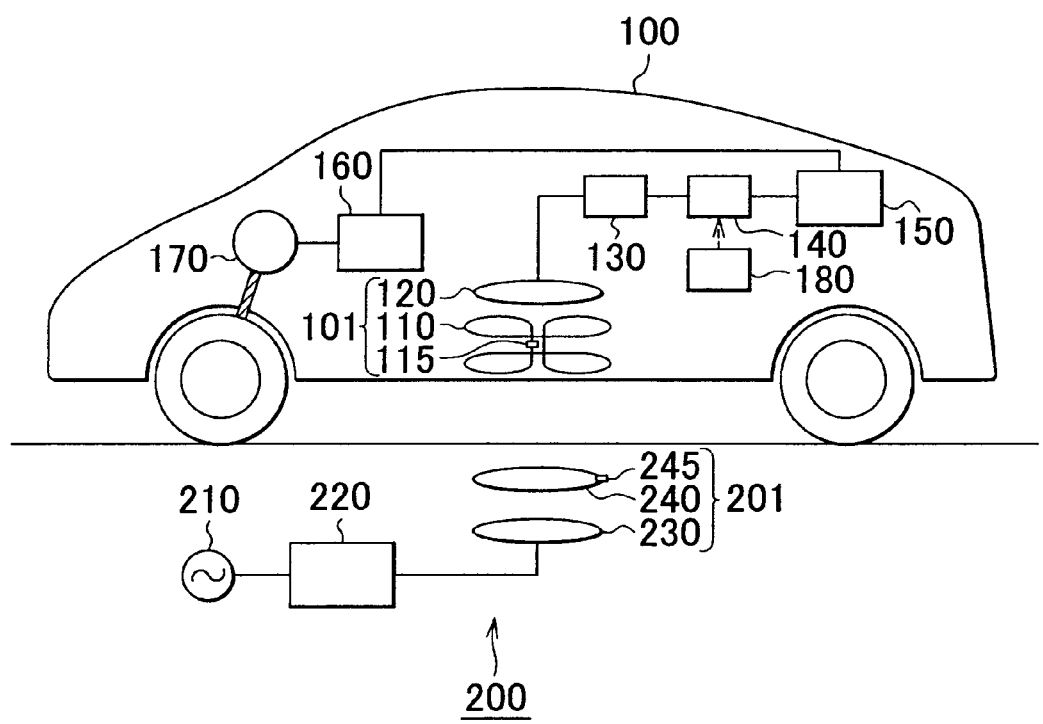
FIG. 21 is a schematic diagram schematically showing an example embodiment, in which a secondary resonance coil 110 including a plurality of unit coils is used in the vehicle 100 and a circular coil is used as the primary resonance coil 240.

FIG. 21 is a schematic diagram schematically showing an example embodiment, in which the secondary resonance coil 110 including the plurality of unit coils is used in the vehicle 100 and a circular coil is used as the primary resonance coil 240.

As shown in FIG. 21, when the secondary resonance coil 110 including the plurality of unit coils is mounted on the vehicle 100, the size of the coil unit 100 is reduced and a large cabin space in the vehicle 100 is secured.

In addition, when the secondary resonance coil 110 including the plurality of unit coils is used in the vehicle 100, it is possible to use, for example, a circular coil or a coil including a plurality of unit coils as the primary resonance coil 240 installed in the coil unit 201, so that it is possible to secure a high degree of freedom of design of the coil unit 201.

Figure 22:
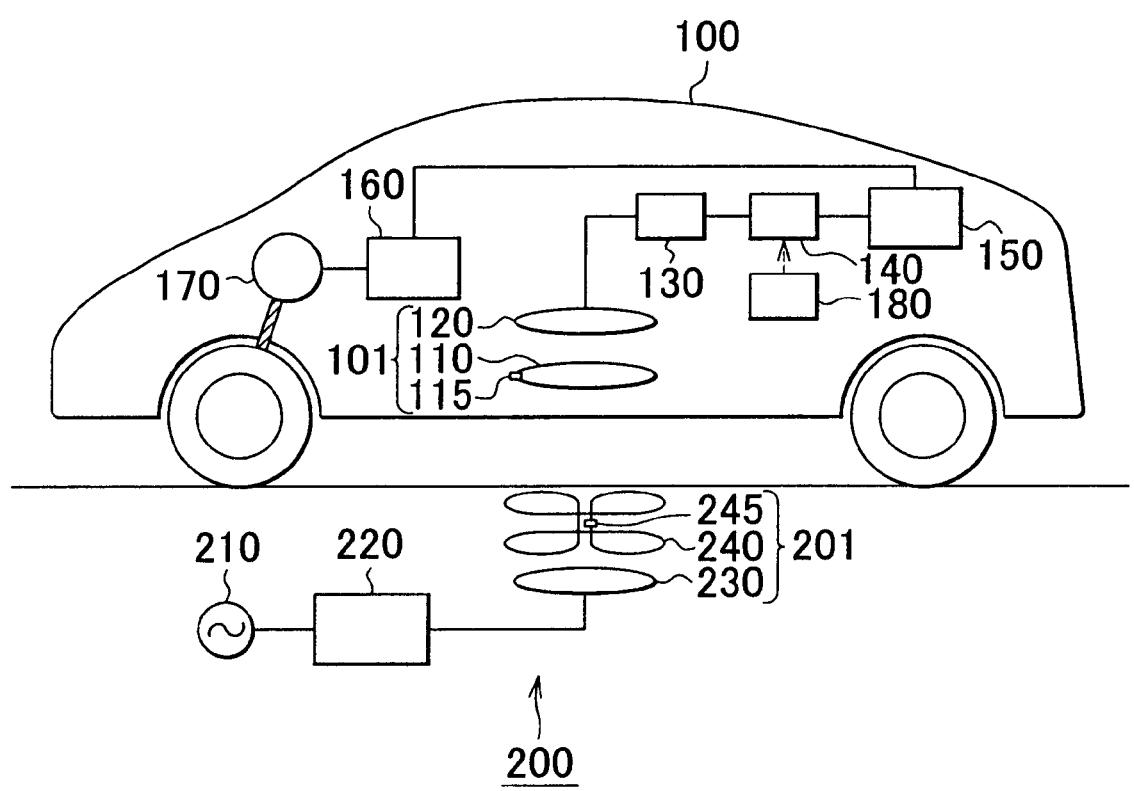
FIG. 22 is a schematic diagram schematically showing an example embodiment, in which the primary resonance coil 240 including the plurality of unit coils is installed in the coil unit 201 and a circular coil is mounted as the secondary resonance coil 110 on the vehicle 100.

FIG. 22 is a schematic diagram schematically showing an example embodiment, in which the primary resonance coil 240 including the plurality of unit coils is installed in the coil unit 201 and a circular coil is mounted as the secondary resonance coil 110 on the vehicle 100.

In the example shown in FIG. 22, it is possible to reduce the weight of the secondary resonance coil 110 by using the circular coil as the secondary resonance coil 110. In particular, when the circular coil is used as the secondary resonance coil 110, the structure of the bobbin that supports the secondary resonance coil 110 is simplified, so that it is possible to reduce the size of the coil unit 101. When the size of the coil unit 101 is reduced, a large cabin space in the vehicle 100 is secured.

Figure 23:
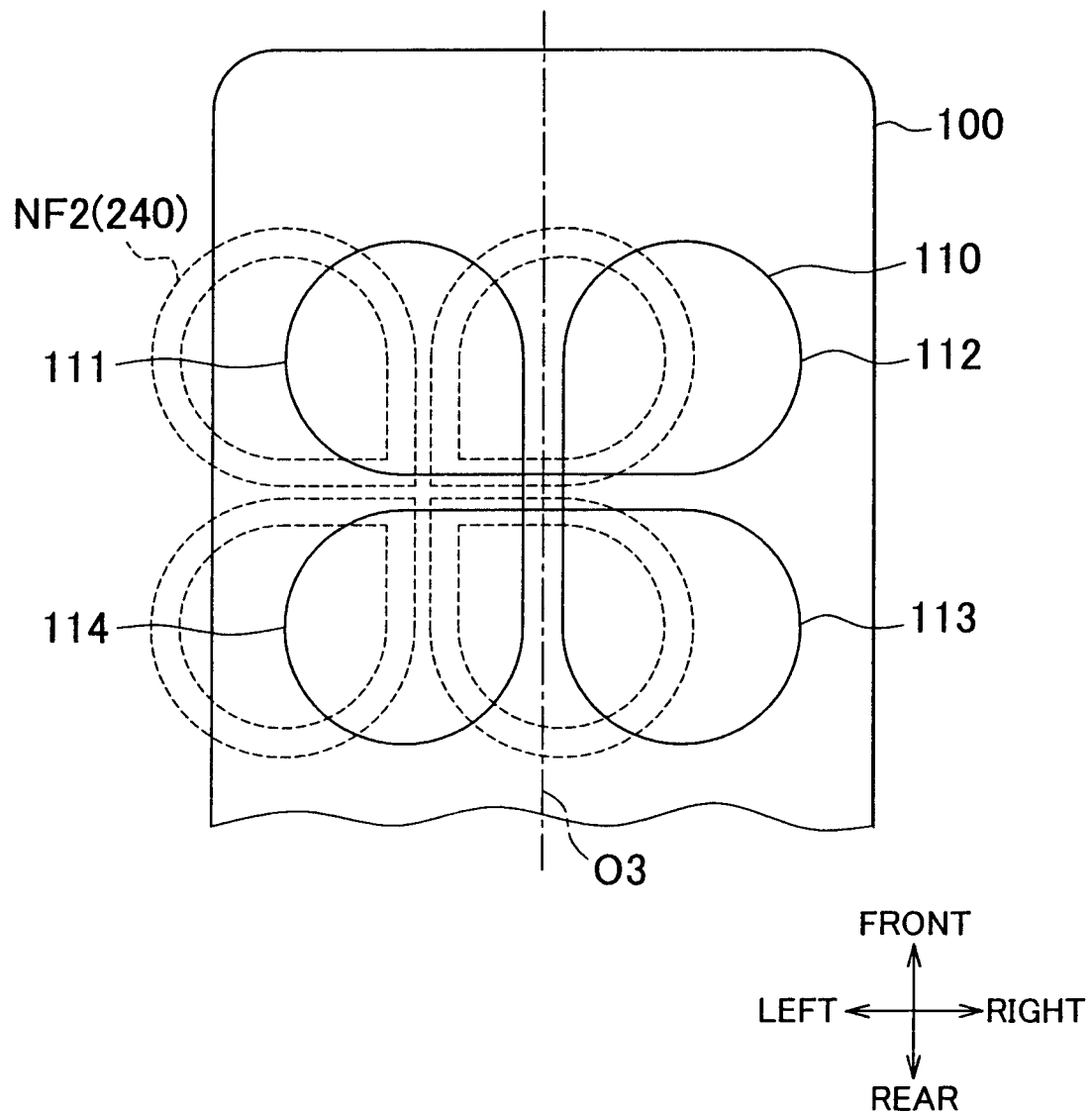
FIG. 23 is a partial plan view of a vehicle that schematically shows a state brought about in a case where a secondary resonance coil 110 including a plurality of unit coils is mounted on the vehicle.

FIG. 23 is a partial plan view of the vehicle that schematically shows a state brought about in a case where the secondary resonance coil 110 including the plurality of unit coils is mounted on the vehicle. As shown in FIG. 23, the unit coils 111 to 114 are arranged so as to be symmetric with respect to the imaginary center line O3 that passes the widthwise center of the vehicle 100 and extends in the longitudinal direction of the vehicle 100. In the state shown in FIG. 23, the secondary resonance coil 110 is offset to the right with respect to the primary resonance coil 240.

Figure 24:
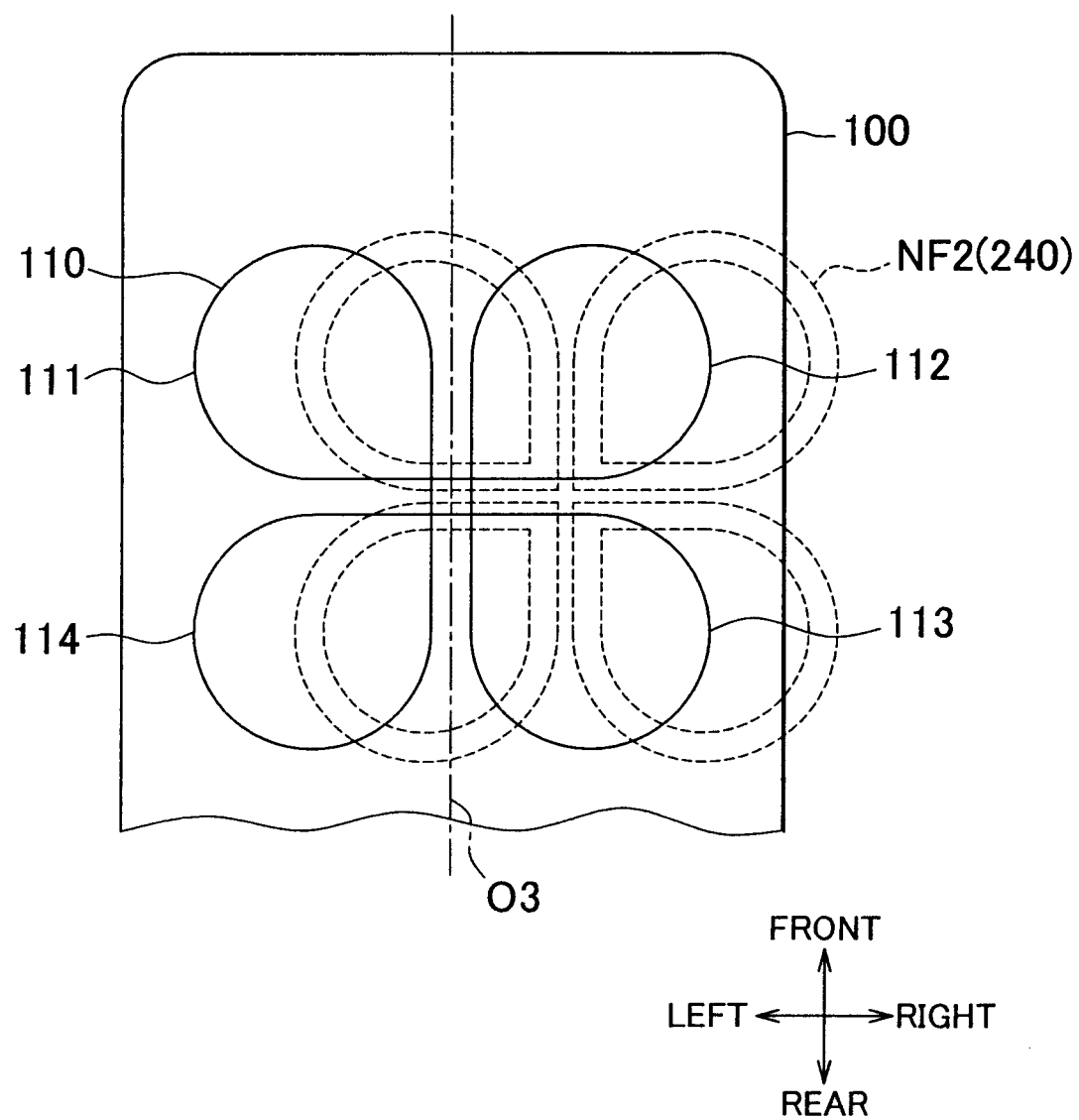
FIG. 24 is a partial plan view of the vehicle that schematically shows a state brought about in a case where the secondary resonance coil 110 including the plurality of unit coils is mounted on the vehicle.

In the state shown in FIG. 24, the secondary resonance coil 110 is offset to the left with respect to the primary resonance coil 240. The intersections of the secondary resonance coil 110 and the near field NF2 in the state shown in FIG. 23 and the intersections of the secondary resonance coil 110 and the near field NF2 in the state shown in FIG. 24 are line symmetrical. Thus, the power supply efficiency between the primary resonance coil 240 and the secondary resonance coil 110 shown in FIG. 23 and the power supply efficiency between the primary resonance coil 240 and the secondary resonance coil 110 shown in FIG. 24 are equal to each other.

Thus, it is possible to suppress the occurrence of the difference in power supply efficiency between the case where the secondary resonance coil 110 is offset to the right with respect to the primary resonance coil 240 and the case where the secondary resonance coil 110 is offset to the left with respect to the primary resonance coil 240.

Figure 25:
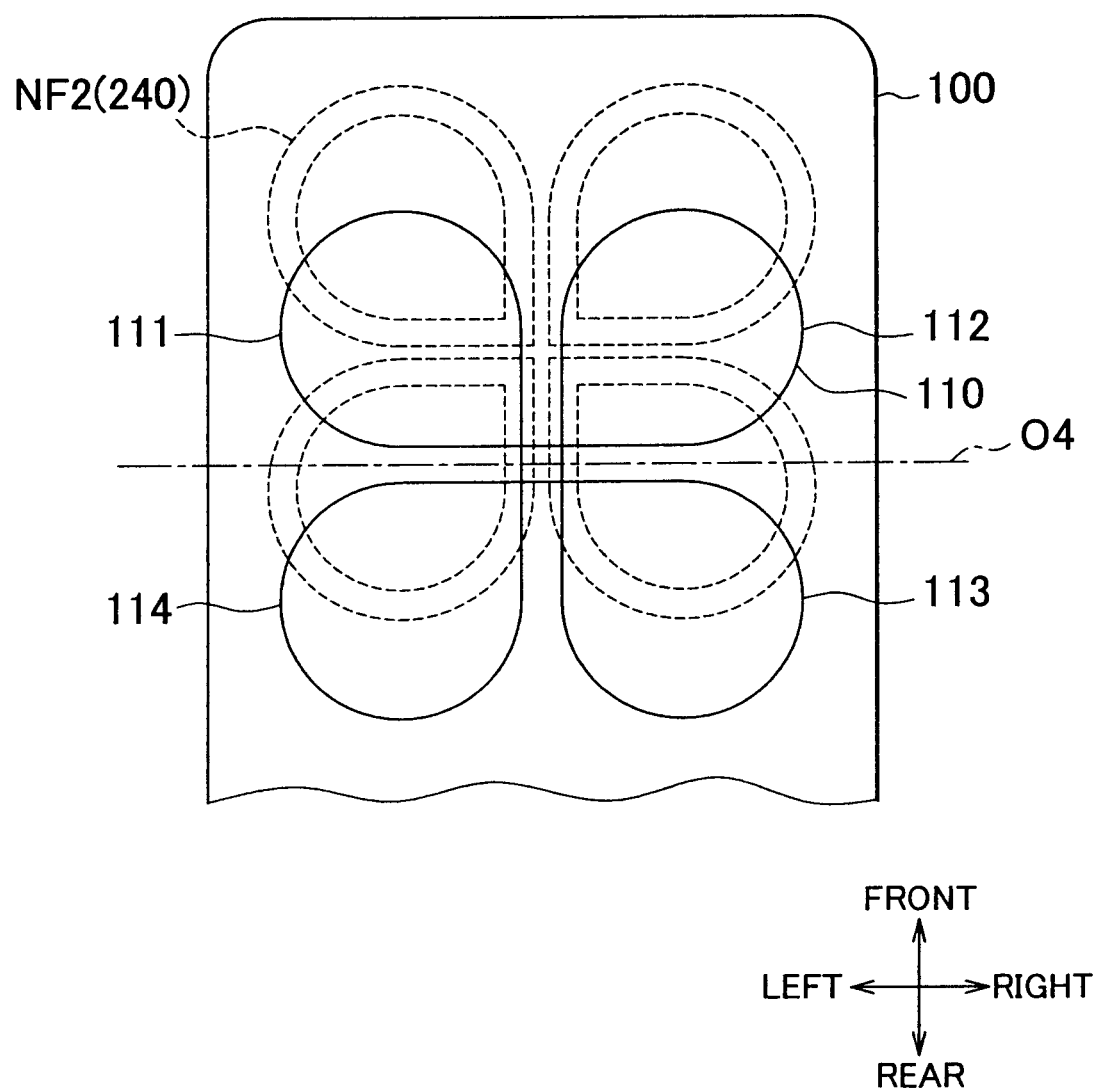
FIG. 25 is a partial plan view of the vehicle that schematically shows a state brought about in a case where the secondary resonance coil 110 including the plurality of unit coils is mounted on the vehicle.

As shown in FIG. 25, the unit coils 111 to 114 are arranged so as to be symmetric with respect to the imaginary center line O4 that extends in the width direction of the vehicle 100. In the state shown in FIG. 25, the secondary resonance coil 110 is offset to the rear with respect to the primary resonance coil 240. In the state shown in FIG. 26, the secondary resonance coil 110 is offset to the front with respect to the primary resonance coil 240.

Figure 26:
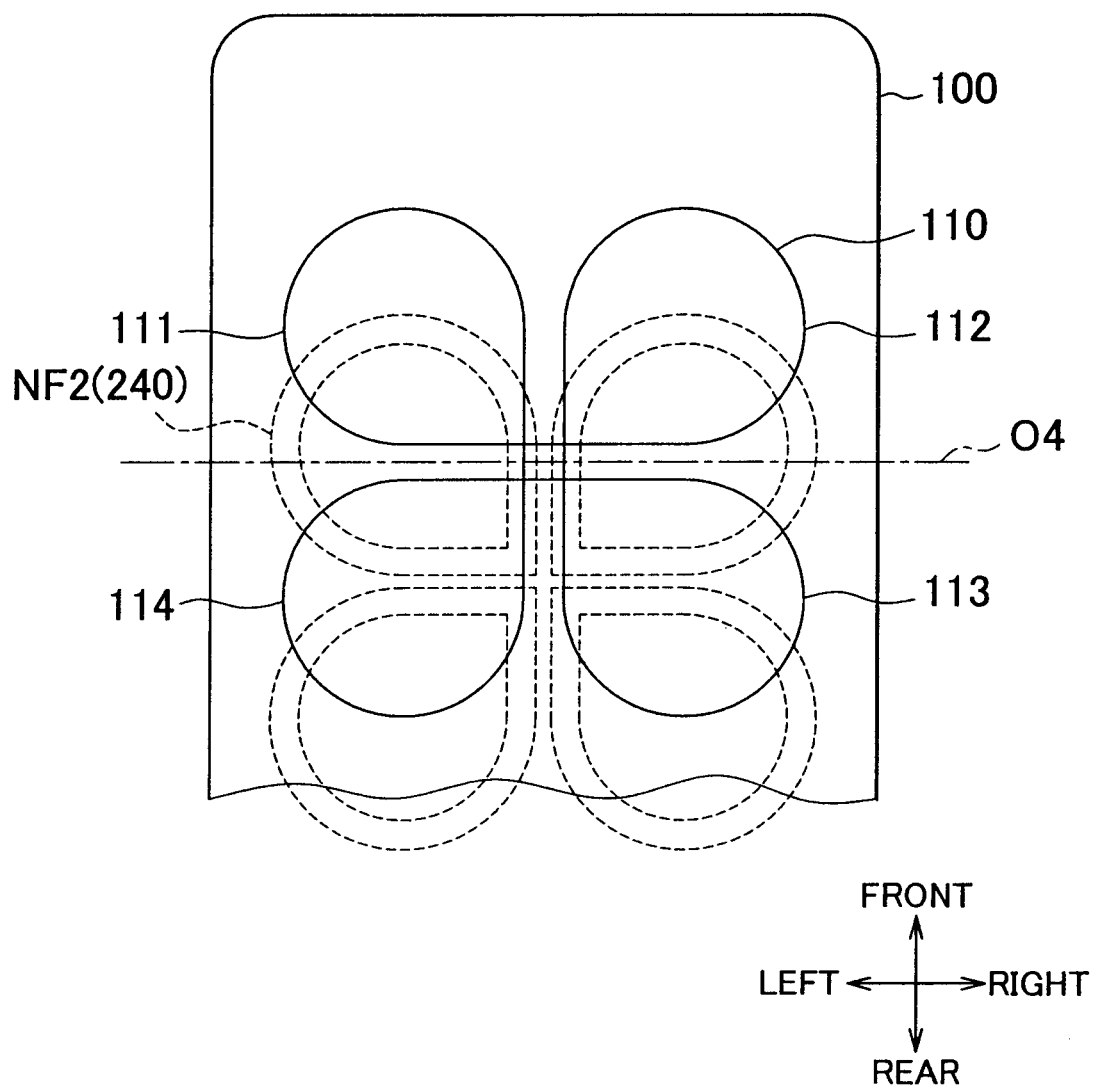
FIG. 26 is a partial plan view of the vehicle that schematically shows a state brought about in a case where the secondary resonance coil 110 including the plurality of unit coils is mounted on the vehicle.

The unit coils 111 to 114 are arranged so as to be symmetric with respect to the imaginary center line O4, so that the power supply efficiency between the secondary resonance coil 110 and the primary resonance coil 240 shown in FIG. 25 and the power supply efficiency between the secondary resonance coil 110 and the primary resonance coil 240 shown in FIG. 26 are equal to each other.

Because the unit coils 111 to 114 are arranged so as to be symmetric with respect to the imaginary center lines O3 and O4, as shown in FIGS. 23 to 26, the mode, in which the secondary resonance coil 110 and the near field NF2 overlap each other, is the same in all of the case where the secondary resonance coil 110 is offset to the right with respect to the primary resonance coil 240, the case where the secondary resonance coil 110 is offset to the left with respect to the primary resonance coil 240, the case where the secondary resonance coil 110 is offset to the front with respect to the primary resonance coil 240, and the case where the secondary resonance coil 110 is offset to the rear with respect to the primary resonance coil 240.

As a result, regardless of which of the front, rear, right, or left, the direction of the offset of the secondary resonance coil 110 with respect to the primary resonance coil 240 is, it is possible to suppress the occurrence of a large difference in power supply efficiency depending on the direction of the offset.

The mode, in which the secondary resonance coil 110 is mounted on the vehicle 100, is not limited to the example as shown in FIG. 23, etc. The mode, in which the secondary resonance coil 110 is mounted, may be one as shown in FIG. 27, for example.

In the example shown in FIG. 27, the unit coil 111 and the unit coil 113 are aligned on the imaginary center line O3 and the secondary resonance coil 110 and the unit coil 114 are aligned on the imaginary center line O4. The mode as shown in FIG. 27 makes it possible to suppress the occurrence of a large difference in power supply efficiency depending on the direction of the offset regardless of which of the right-front, right-rear, left-front, or left-rear, the direction of an oblique offset is.

It should be understood that the embodiments herein described are merely examples and are not restrictive. The scope of the invention is determined not by the above description but by claims and it is intended that all the modifications within the scope of claims and the equivalent thereof are included in the scope of the invention.

The invention can be applied to a coil unit, a non-contact power transmitting apparatus, a non-contact power receiving apparatus, a vehicle, and a non-contact power supply system.

What is claimed is:

1. A coil unit comprising:
a second self-resonant coil formed of a conducting wire, the coil includes a plurality of unit coils that are disposed not to overlap each other when viewed along an axial direction of each unit coil, and a number of turns of each of the unit coils is set to one, and the coil performs at least one of transmission and reception of electric power to and from a first self-resonant coil spaced apart from the second self-resonant coil via electromagnetic resonance with the first self-resonant coil,
wherein directions of magnetic fields formed by the unit coils are the same.

2. The coil unit according to claim 1, wherein the unit coils are arranged so as to be adjacent to each other.

3. The coil unit according to claim 1, wherein the unit coils are disposed in substantially the same plane and axes of the unit coils are substantially parallel.

4. The coil unit according to claim 1, wherein the unit coils are annularly arranged.

5. The coil unit according to claim 1, wherein a number of unit coils is four and the unit coils are arranged so as to be rotationally symmetric with respect to an imaginary line.

6. The coil unit according to claim 1, wherein:
a resonance frequency of the first self-resonant coil is equal to a resonance frequency of the second self-resonant coil;
a first near field is formed around the first self-resonant coil by causing an electric current, whose frequency is set to the resonance frequency, to flow in the first self-resonant coil that is configured to be capable of at least one of transmission and reception of electric power to and from the second self-resonant coil;
the second self-resonant coil is enabled to receive electric power from the first self-resonant coil by being positioned in the first near field;
the second self-resonant coil is enabled to form a second near field around the second self-resonant coil by a flow of an electric current in the second self-resonant coil, whose frequency is set to the resonance frequency; and the second self-resonant coil is enabled to transmit electric power to the first self-resonant coil when the first self-resonant coil is positioned in the second near field.

7. A non-contact power transmitting apparatus comprising:
a first electromagnetic induction coil that receives electric power from an external power source and transmits electric power to the second self-resonant coil; and
the coil unit according to claim 1.

8. A non-contact power receiving apparatus comprising:
the coil unit according to claim 1; and
a second electromagnetic induction coil that receives electric power from the second self-resonant coil.

9. A vehicle comprising:
the non-contact power receiving apparatus according to claim 8; and
an electrical storage device that receives electric power from the second electromagnetic induction coil.

10. The vehicle according to claim 9, wherein the unit coils are arranged so as to be symmetric with respect to an imaginary axis that passes a widthwise center of the vehicle and extends in a longitudinal direction of the vehicle.

11. The vehicle according to claim 9, wherein the unit coils are arranged so as to be symmetric with respect to an imaginary axis that extends in a width direction of the vehicle.

12. A non-contact power supply system comprising:
a first coil unit including a first self-resonant coil having a plurality of first unit coils, wherein directions of magnetic fields formed by the first unit coils are the same; and
a second coil unit including a second self-resonant coil formed of a conducting wire, the coil having a plurality of second unit coils that are disposed not to overlap each other when viewed along an axial direction of each unit coil, and a number of turns of each of the unit coils is set to one, the second unit coils being configured to perform at least one of transmission and reception of electric power to and from the first self-resonant coil via electromagnetic resonance with the first self-resonant coil, wherein directions of magnetic fields formed by the second unit coils are the same.

* * * * *